United States Patent
Freund

(10) Patent No.: US 8,560,425 B2
(45) Date of Patent: Oct. 15, 2013

(54) METHOD AND SYSTEM FOR ADDING LIQUIDITY TO ALTERNATIVE INVESTMENT TRANSACTIONS

(75) Inventor: Peter C. Freund, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1987 days.

(21) Appl. No.: 10/315,242

(22) Filed: Dec. 10, 2002

(65) Prior Publication Data

US 2003/0130920 A1 Jul. 10, 2003

Related U.S. Application Data

(60) Provisional application No. 60/337,177, filed on Dec. 10, 2001.

(51) Int. Cl.
*G06Q 40/00* (2012.01)
(52) U.S. Cl.
USPC .......................................... 705/37; 705/36 R
(58) Field of Classification Search
USPC ............................................. 705/35, 36 R, 37
See application file for complete search history.

(56) References Cited

U.S. PATENT DOCUMENTS

| | | | | |
|---|---|---|---|---|
| 3,634,669 A | * | 1/1972 | Soumas et al. | 705/36 R |
| 4,598,367 A | * | 7/1986 | DeFrancesco et al. | 705/36 R |
| 4,642,768 A | * | 2/1987 | Roberts | 705/4 |
| 4,736,294 A | * | 4/1988 | Gill et al. | 705/38 |
| 4,739,478 A | * | 4/1988 | Roberts et al. | 705/36 R |
| 4,831,526 A | * | 5/1989 | Luchs et al. | 705/4 |
| 5,220,500 A | * | 6/1993 | Baird et al. | 705/36 R |
| 5,227,874 A | * | 7/1993 | Von Kohorn | 705/10 |
| 5,481,647 A | * | 1/1996 | Brody et al. | 706/11 |
| 5,523,942 A | * | 6/1996 | Tyler et al. | 705/4 |
| 5,583,778 A | * | 12/1996 | Wind | 705/34 |
| 5,592,590 A | * | 1/1997 | Jolly | 706/59 |
| 5,611,052 A | * | 3/1997 | Dykstra et al. | 705/38 |
| 5,649,116 A | | 7/1997 | McCoy | |
| 5,655,085 A | | 8/1997 | Ryan | |
| 5,704,045 A | * | 12/1997 | King et al. | 705/35 |
| 5,717,865 A | | 2/1998 | Stratmann | |
| 5,732,397 A | | 3/1998 | DeTore | |
| 5,765,144 A | | 6/1998 | Larche | |
| 5,774,878 A | | 6/1998 | Marshall | |

(Continued)

OTHER PUBLICATIONS

James D. Cox, Corporations, 1996, 2nd ed., p. 42, 118, 131-132.*

(Continued)

*Primary Examiner* — Thomas M Hammond, III
*Assistant Examiner* — Ann Loftus
(74) *Attorney, Agent, or Firm* — Goodwin Procter LLP

(57) ABSTRACT

The invention provides a method and system for providing liquidity to an alternative investment fund, such as to address the problem of illiquidity for investors in primary funds such as alternative investment funds. The transaction system includes investors in an alternative investment fund, a manager of the fund, and a structure that provides liquidity to investors who are otherwise saddled with illiquid ownership interests in the fund. The structure provides a fund investor with an option to designate some of the investor's interest in the fund to the structure, which will provide a preferred cash flow to the structure and which will provide immediate funds to the investor. In one aspect of the invention, the liquidity-providing structure is implemented using a trust to which the investor assigns his interest. The goal of the invention is to provide liquidity to investors of otherwise illiquid assets.

22 Claims, 20 Drawing Sheets

(56) References Cited

U.S. PATENT DOCUMENTS

| | | | |
|---|---|---|---|
| 5,774,883 A | | 6/1998 | Anderson |
| 5,852,811 A | | 12/1998 | Atkins |
| 5,875,437 A | | 2/1999 | Atkins |
| 5,878,405 A | * | 3/1999 | Grant et al. ............... 705/39 |
| 5,913,202 A | | 6/1999 | Motoyama |
| 5,920,848 A | | 7/1999 | Schutzer |
| 5,930,775 A | | 7/1999 | McCauley |
| 5,987,434 A | | 11/1999 | Libman |
| 6,009,415 A | | 12/1999 | Shurling |
| 6,018,722 A | | 1/2000 | Ray |
| 6,021,397 A | | 2/2000 | Jones |
| 6,061,661 A | * | 5/2000 | Hagan ................. 705/36 R |
| 6,064,986 A | * | 5/2000 | Edelman ............... 705/36 R |
| 6,085,174 A | * | 7/2000 | Edelman ............... 705/36 R |
| 6,088,686 A | | 7/2000 | Walker |
| 6,154,732 A | * | 11/2000 | Tarbox ................. 705/36 R |
| 6,157,918 A | * | 12/2000 | Shepherd .............. 705/36 R |
| 6,199,077 B1 | | 3/2001 | Inala |
| 6,202,053 B1 | | 3/2001 | Christiansen |
| 6,236,972 B1 | * | 5/2001 | Shkedy ......................... 705/1 |
| 6,253,191 B1 | * | 6/2001 | Hoffman ....................... 705/35 |
| 6,622,130 B1 | * | 9/2003 | Shepherd .............. 705/36 R |
| 7,062,459 B1 | * | 6/2006 | Herbst et al. ................ 705/37 |
| 7,089,202 B1 | * | 8/2006 | McNamar et al. ........... 705/35 |
| 7,181,422 B1 | * | 2/2007 | Philip et al. ............ 705/36 R |
| 7,249,075 B1 | * | 7/2007 | Altomare et al. ............. 705/35 |
| 7,580,875 B1 | * | 8/2009 | Finn et al. ............. 705/36 R |
| 2001/0018677 A1 | * | 8/2001 | Hoffman ....................... 705/36 |
| 2001/0032189 A1 | * | 10/2001 | Powell .......................... 705/59 |
| 2001/0034692 A1 | * | 10/2001 | McRedmond ............... 705/37 |
| 2001/0042034 A1 | * | 11/2001 | Elliott ............................ 705/35 |
| 2001/0049651 A1 | * | 12/2001 | Selleck .......................... 705/37 |
| 2002/0007329 A1 | | 1/2002 | Alcaly et al. |
| 2002/0019793 A1 | | 2/2002 | Frattalone |
| 2002/0026395 A1 | * | 2/2002 | Peterson ....................... 705/35 |
| 2002/0026401 A1 | * | 2/2002 | Hueler .......................... 705/35 |
| 2002/0046154 A1 | * | 4/2002 | Pritchard ...................... 705/37 |
| 2002/0055905 A1 | * | 5/2002 | Jannah et al. ................ 705/38 |
| 2002/0099640 A1 | * | 7/2002 | Lange ........................... 705/37 |
| 2002/0103667 A1 | * | 8/2002 | Jannah et al. .................. 705/1 |
| 2002/0103852 A1 | * | 8/2002 | Pushka ........................ 709/203 |
| 2002/0133445 A1 | * | 9/2002 | Lessin .......................... 705/36 |
| 2002/0156709 A1 | * | 10/2002 | Andrus et al. ............... 705/35 |
| 2002/0161679 A1 | * | 10/2002 | Randolph et al. ............ 705/35 |
| 2002/0165809 A1 | * | 11/2002 | Gendelman .................. 705/36 |
| 2002/0174042 A1 | * | 11/2002 | Arena et al. .................. 705/35 |
| 2002/0174081 A1 | * | 11/2002 | Charbonneau et al. ...... 706/15 |
| 2002/0194097 A1 | * | 12/2002 | Reitz ............................ 705/36 |
| 2003/0050884 A1 | * | 3/2003 | Barnett ......................... 705/35 |
| 2003/0061139 A1 | * | 3/2003 | Roberts ........................ 705/36 |
| 2005/0021435 A1 | * | 1/2005 | Hakanoglu et al. .......... 705/36 |
| 2006/0059085 A1 | * | 3/2006 | Tucker .......................... 705/38 |
| 2010/0125533 A1 | * | 5/2010 | Hoffmann et al. ....... 705/36 R |

OTHER PUBLICATIONS

Leonard Gross, Agency & Partnership, 1998, 5th ed., p. 47-8.*
Robert D. Brain, Contracts, 1997, 4th ed., p. 79-80, 211.*
Brian Williams, Trading, 1993, p. 10-11.*
Silva, Jennifer Burke, "Bowie Bonds Sold for Far More than a Song: The Securitization of Intellectual Property as a Supercharged Vehicle for High Technology Financing" 1999, Santa Clara Computer and High Technology Law Journal, vol. 15, pp. 195-230.*
Borden, Jeff, An Uncertain Defender, Aug. 25, 1997, Crain's Chicago Business, vol. 20, Iss. 34, p. 1 (pdf pp. 1-3).*
Engel, Erickson and Maydew, Debt-Equity Hybrid Securities, Autumn 1999, Jornal of Accounting Research, vol. 37, No. 2, pp. 249-274.*
Borden, Jeff, Defender Heirs Win Paper Chase, May 24, 1999, Crain's Chicago Business, vol. 22, Iss. 21, p. 3 (pdf pp. 1-3).*
Primack, Dan, Soothing the Mark-to-Market Meltdown, Apr. 30, 2001, Private Equity Week, vol. 8, No. 17, p. 1 (pdf pp. 1-2).*
Cocheo, Steve, Time to Rethink your Funding Diet? (part 2 of a series), Jun. 1998, ABA Banking Journal, pp. 20, 24 and 25.*
Boehler, Mary, Risky Business: Managing Closely held Assets in Trusts and Estates, Feb. 1998, Trusts & Estates, pp. 10, 14, 16, 18, 20 and 70.*
Schwarcz, Steven, The Parts are Greater than the Whole: How Securitization of Divisible Interests can Revolutionize Structured Finance and Open the Capital Markets to Middle-market Companies, 1993, Columbia Business Law Review, pp. 139-167.*
Alex Bance Why and How to Invest in Private Equity, Feb. 2002.
Dan Primack Prime Edge and J.P. Morgan Partners Put Private Equity Into Debt, Jul. 2001.
Lisa Bransten Second Time a Charm?, Oct. 2001.
Erica Goode on Profit, Loss and the Mysteries of the Mind, Nov. 2002.
Wall Street Journal Article Fidelity Helps Fund Sellers Trim the Taxes They'll Owe, Nov. 2002.
Allison Colter Register Hedge Funds Are Finding a Wider Audience, (no date).
Colin McGrady Secondary Attraction—The Advantages of Purchasing Secondaries, Aug. 2002.
Patent Cooperation Treaty (PCT/US02/39455), International Search Report (ISR) mailed Jul. 7, 2003.
Asch, Latimer, How the RMAIFair, Isaac credit-scoring model was built, Journal of Commercial Lending, vol. 77, No. 10, pp. 10-16, Jun. 1995.
Taylor, Clair et al., Card Issuers Turn to Scoring as They Face Increasing Risk, Financial Services Report, vol. 8, No. 15, pg. 1, Jul. 24, 1991.
Roger, John C. et al., A Credit Scoring Model to Evaluate the Credit Worthiness of Credit Card Applicants, Developments in Marketing Science, vol. 5, 1982.
Hickman, Michael, Using Software to Soften Big-Time Competition, Bank Systems & Technology, vol. 31, No. 8, pp. 38-40, Jun. 1994.
Sullivan, Deidre, Scoring Borrower Risk, Mortgage Banking, vol. 55, No. 2, pp. 94-98, Nov. 1994.
Jameson, Ron, Expanding Risk Management Strategies: Key to Future Survival, vol. 84, No. 5, Credit World, pp. 16-18, May 1996.
Friedland, Marc, Credit Scoring Digs Deeper into Data, Credit World, vol. 84, No. 5, pp. 19-23, May 1996.
Credit Scoring New Markets, Bank Technology News, vol. 9, No. 7, p. 1, Jun. 1996.
Carey, James J., The Sub-Prime Credit Market: Identifying Good Risks for Unsecured Cards vol. 85, No. 1, Credit World, pp. 13-15, Sep. 1996.
Opportunity Knocks at Scoring's Door, Collection & Credit Risk, vol. 2, No. 4, Mar. 1997.
Makuch, Willaim J., Managing Consumer Credit Delinquency in the US Economy: A Multi-Billion Dollar Management Science Application, Interfaces, pp. 90-109, Feb. 1992.
Fred Fortner, There Must be a Better Way, Mortgage Banking vol. 53, No. 2, pp. 12-22, Nov. 1, 1992.
Jane Bryant Quinn, Washington Post, Credit Card Issuers Keeping a Closer Watch on How You Pay Bills, Apr. 25, 1988, Business Section.
Soulignac, Charles, Secondary market in private equity—an asset class in expansion, Fondinvest Capital, http://www.altassets.com/caseforsectors/2002/nz3261.php , printed Apr. 9, 2008, pp. 1-4, purported to be a Mar. 12, 2002 article from Fondinvest Capital.
Byers, Brett, Secondary sales of private equity interests, Venture Capital Fund of America, http://www.altassets.com/casefor/sectors/2002/nz3269/php, printed Apr. 9, 2008, pp. 1-8, purported to be a Feb. 18, 2002 article from Venture Capital Fund of America.

* cited by examiner

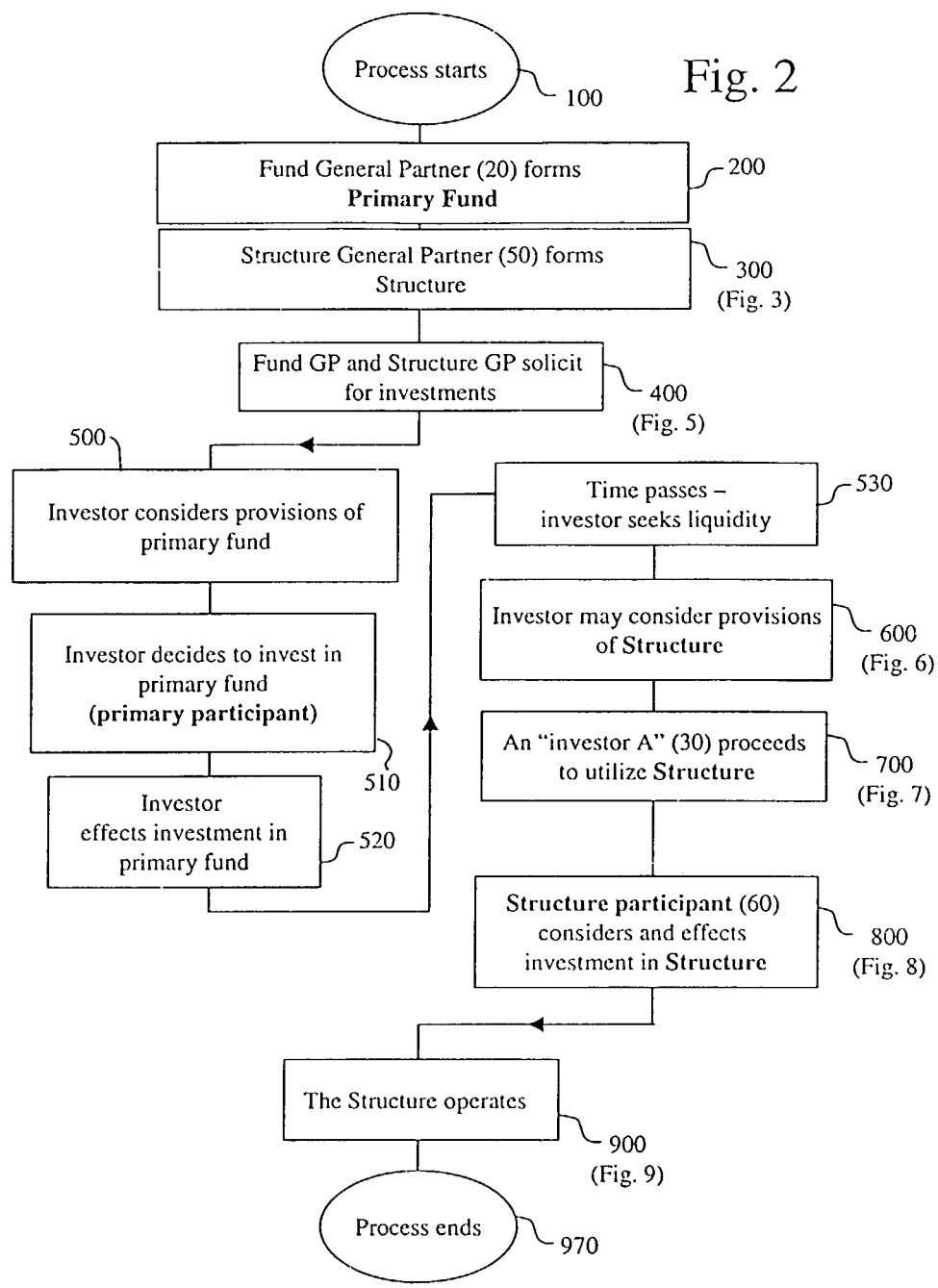

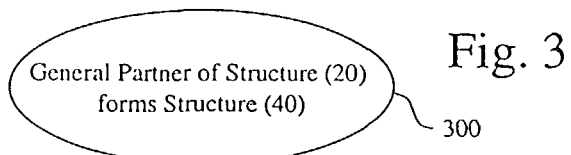

Fig. 3

( General Partner of Structure (20) forms Structure (40) ) — 300

General partner (GP) of Structure drafts provisions of Structure

• The Structure's GP secures agreement of the fund GP jointly to provide the Structure;

• The Structure's GP purchases and may pool interests in the cash flows from primary fund participations to form the Structure;

• The interests in the pool can be homogeneous, from a single primary fund or can be Participations having diversity of type, industry, geography and vintage year;

• The Structure will buy one or more tranches of the cash flows returned from the underlying primary fund participations;

• the Structure's GP (50) may fund from the outset, pay over time, and/or provide a guarantee for any unfunded AIFund LP commitments; and

• the Structure GP may seek to securitize Structure assets, either homogeneous or a diversified pool. The Structure equity, with or without an insurance wrap, may support a credit rating permitting the GP cheaply to fund a portion of the Structure with debt instruments such as commercial paper rated A1/P1.

— 310

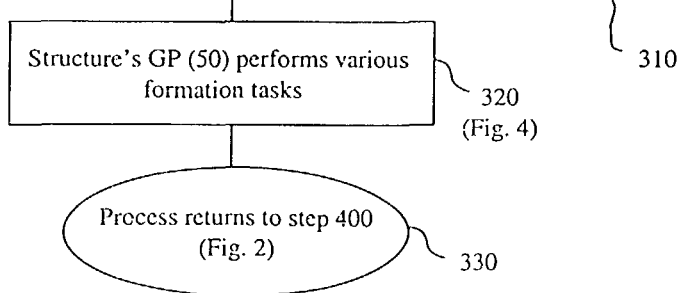

Structure's GP (50) performs various formation tasks — 320 (Fig. 4)

( Process returns to step 400 (Fig. 2) ) — 330

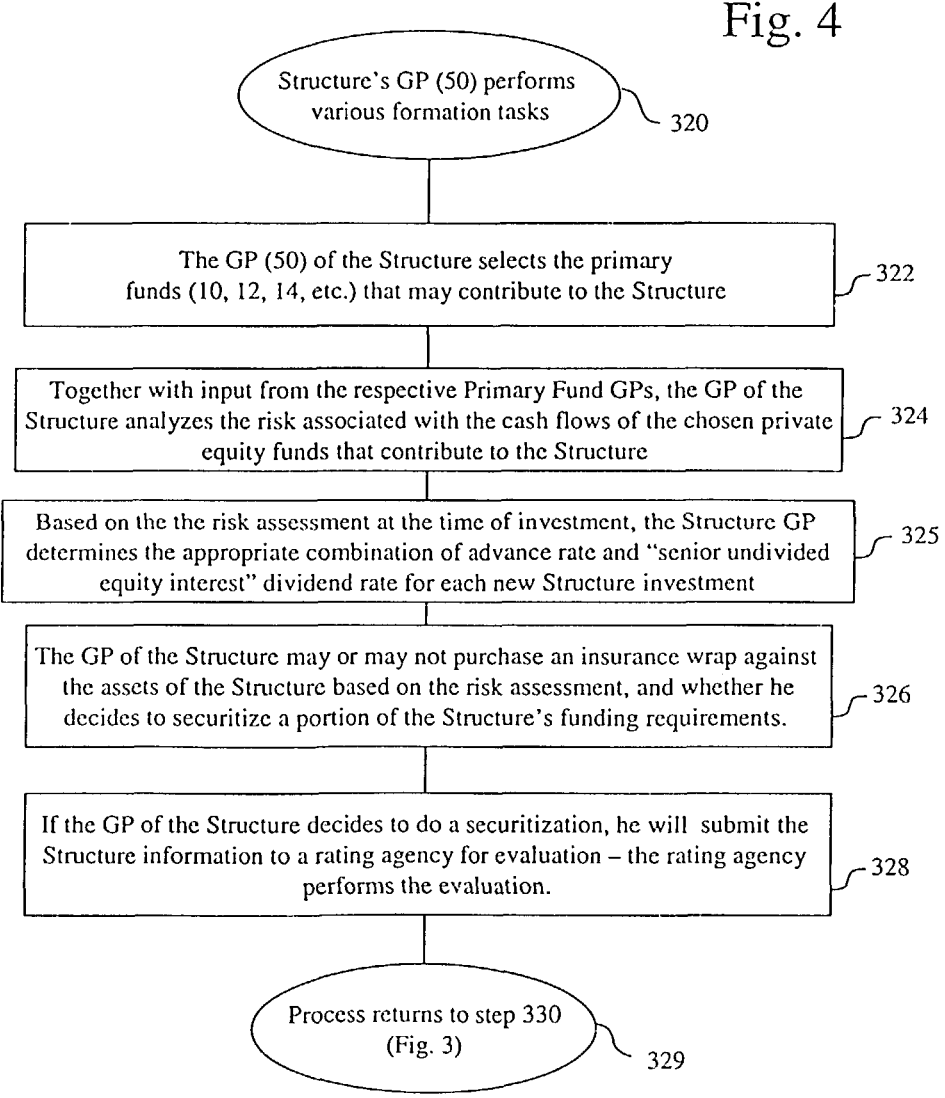

Fig. 12

1200 PARTICIPANTS

| | |
|---|---|
| LP Investor: | Eligible institutional and individual investors, approved by the Eligible Sponsor. |
| Eligible Sponsors: | Specific top private equity fund sponsors (to be determined). |
| | The Eligible Sponsor will be paid an annual fee of ( ) % of the outstanding SUEI balances, plus receive ( )% of the Residual Equity Distribution allocated to the SUEI, as compensation for marketing and providing other reporting services for the transaction |
| | Services include LP Investor identification, valuation of LP Interests, permission for assignment of LP Interest to the LP Trust, and standard periodic reporting on market value and condition of the Private Equity Fund |
| Trustee: | Bank One, NA |
| Marketing and Servicing Agent: | Eligible Sponsors |
| Origination Agent: | Bank One Ventures |
| Investment Enhancer: | An insurance company or financial services company acceptable to the Credit Enhancer and the Rating Agencies |
| Credit Enhancer: | A monoline insurance company rated AAA |
| Structuring and Placement Agent: | Banc One Capital Markets, Inc. |

Fig. 13

1300 — ASSETS

The Senior Undivided Equity Interest ("SUEI"): Each SUEI represents a senior ownership interest in the assets of the LP Trust.

The SUEI represents an ownership interest in the first cash distributions available to the LP Trust, as holders of the related LP Interests, up to the SUEI Preferred Capital Amount.

In addition, the SUEI receives a Cumulative Preferred Distribution amount, plus {10}% of the Residual Equity Distributions.

Taxes and voting rights will be allocated on a pro rata basis, between the SUEI and the RUEI, based on the initial SUEI Preferred Capital Amount and the Market Value of the LP Interest.

*Note: structure may need to be amended to be sure the SUEI is considered Equity

The Residual Undivided Equity Interest ("RUEI"): Each RUEI represents a subordinated ownership interest in the assets of the LP Trust.

The RUEI represents an ownership interest in 90% of the Residual Equity Distributions available to the LP Trust.

SUEI Preferred Capital Amount: The face amount of the SUEI as determined on an individual private equity fund basis.

Preferred Cumulative Distribution: {15%} as a percentage of the current outstanding capital of the SUEI (Preferred Capital Amount, plus Preferred Cumulative Distribution amounts not yet received, compounded semi-annually)

Total Preferred SUEI Distribution: SUEI Preferred Capital Amount, plus the Preferred Cumulative Distribution

Residual Equity Distributions: The Residual Equity Distributions equal all amounts distributed by LP Trust after the Total Preferred SUEI Distributions are made.

LP Trust Assets: LP Interests contributed by the LP Investor, approved by the Eligible Sponsor. A separate LP Trust is created for each private equity fund.

SUEI Trust Assets: Senior Undivided Equity Interests ("SUEIs") in the LP Trusts, all dividends and payments of capital on the SUEI, the Support Contracts, and all payments received on the Support Contracts

Fig. 14

1400 — CONTRACTS

| | |
|---|---|
| Support Contracts: | A contract between an Investment Enhancer and the SUEI Equity Trust. |
| | The contract obligates the Investment Enhancer to fund an amount on the Final Payment Date sufficient to retire all outstanding Senior Secured Notes. |
| | If the Investment Enhancer makes a payment on the Final Payment Date, the Investment Enhancer will take title to all SUEI Equity Trust Assets. |
| | The Investment Enhancer will be paid { } % per annum, for providing such support. |
| | The face amount of the Support Contract will determined based on the expected initial Senior Secured Notes that will be financed. It is anticipated that the face amount of the Support Contract will equal 30-40% of the current valuation of the limited partnership investment, depending on the Eligible Fund. |
| | The legal form of the Support Contract must be acceptable to the Credit Enhancer and the rating agencies, and is anticipated to be in the form of a "Put" or "floor" equity derivative. |
| Support Contract Exercise Rights: | If all of the Senior Secured Notes have not been paid on the Final Payment Date, the Trust Certificate Holders will have the option: (i) to allow the Support Contract to lapse, and retain the assets in the SUEI Equity Trust, or (ii) put the SUEI Equity Trust assets to the Credit Enhancer. |
| | If Trust Certificate holders put the SUEI Equity Trust assets, the Credit Enhancer will have the option: (i) to allow the Support Contract to lapse, and retain the assets in the SUEI Equity Trust, or (ii) to exercise the Support Contract, receive payment, and put the assets in the SUEI Equity Trust to the Investment Enhancer. |

Fig. 15

| 1500 | TRANSACTIONS |
|---|---|
| Sale of SUEI: | The LP Investors offer to sell, and the SUEI Trust agrees to purchase, for a price equal to the SUEI Preferred Capital Amount. To pay for the SUEIs, SUEI Trust issues Senior Secured Notes & Trust Certificates. |
| Securities Offered: | Senior Secured Notes: {$1bil}<br>Trust Certificates {$100mm} |
| Senior Secured Notes: | Senior Secured Notes represent right to receive payments of interest at the applicable yield on the Senior Secured Notes and principal on or before the Final Payment Date. |
| Credit Enhancement: | The Senior Secured Notes will be insured by the Credit Enhancer. |
| Yield on the Senior Secured Notes: | Floating rate Libor, plus { }% with a cap of { }% |
| Trust Certificates: | Trust Certificates represent a fractional undivided beneficial interest in the SUEI Trust Assets and represent the right to receive all payments made to the SUEI Trust, after retirement of all Senior Secured Notes. |
| Senior Secured Notes Principal Payments: | Senior Secured Notes will amortize immediately based on cash distributions available to the LP Trust, after payment of certain fees, interest on the Senior Secured Notes, and reimbursement of the cash collateral account or Liquidity Facility, if required. |
| Final Payment Date: | {5 years from closing date} |
| Allocations of Distributions: | Distributions received on the SUEI, payments received on any Support Contracts, and investment earnings will be distributed in the following order of priority: |

1. Trustee Fees;
2. Servicing Fees
3. Support Contract Fees
4. Interest due on Senior Secured Notes;
5. Origination and Marketing Fees(?);
6. Reimbursement of the Cash Collaterial Account or Liquidity Facility
7. Principal on Senior Secured Notes;
8. To the Trust Certificates (after the Senior Secured Notes have been paid in full)

If distributions received in the current period are insufficient to cover 1-5 above, amounts as necessary may be taken out of the Liquidity Facility. If funds are insufficient, or the principal amount of the Senior Notes are not paid in full by the Final Payment Date, The Credit Enhancer will make any payments necessary, after all amounts on deposit in the trust have been used.

Fig. 16

LIQUIDITY FACILITY

1600

| Liquidity Facility: | A Liquidity Facility will be established at Closing by the Trust Certificate holders equal to {25% of the amount of the Support Contract}, to cover temporary shortfalls in interest on the Senior Trust Notes, and other expenses. The balance available from the Liquidity Facility will be maintained such that the Support Contract plus the Liquidity Facility always exceeds {112}% of the outstanding Senior Secured Notes. The Form and provider of the Liquidity Facility will be acceptable to the Credit Enhancer and the rating Agencies. |

1700 ADDITIONAL PROVISIONS    Fig. 17

| | |
|---|---|
| Representation and Warranties, Indemnification and Events of Default: | Senior Secured Note holders, Trust Certificate holders, Servicer, and each Sponsor will make customary representations, warranties and indemnifications. |
| Legal Opinions: | A tax opinion will be received approving: (i) equity treatment of the SUEI; and (ii) 'true sale' treatment of the transaction between the LP Investor and the SUEI Equity Trust.<br><br>Other standard opinions as necessary will also be provided |
| GAAP Accounting Treatment: | It is anticipated that for GAAP accounting purposes:<br>- the LP Trust will be considered a QSPE<br>- the sale of the SUEI will be considered a sale under FAS140 |
| Tax Status: | It is anticipated that for Federal Tax Purposes:<br>- The SUEI will be considered equity for tax purposes.<br>- The sale of the SUEI will not be considered a financing<br>- Senior Secured Notes will be treated a debt of the SUEI Equity Trust.<br>- The Trust Certificates will be treated as equity of the SUEI Equity Trust. |
| Rating Requirement: | It is expected that the Senior Secured Notes will be rated A1-P1 or its equivalent, by at least two of the nationally recognized rating agencies. |

Fees and Expenses:

All Upfront Legal, Accounting, Structuring Agent, Placement Agent, and other Issuance Fees and Expenses will be paid by the LP Investors, Certificate Holders and the Sponsors, as agreed to upfront.

All Trustee Fees, Origination Fees, Marketing Fees, Servicing Fees, Support Contract Fees, Credit Enhancement Fees, and any other misc. fees and expenses will be paid out of the SUEI Trust Assets.

METHOD AND SYSTEM FOR ADDING LIQUIDITY TO ALTERNATIVE INVESTMENT TRANSACTIONS

CROSS REFERENCE TO RELATED APPLICATION

The subject matter of this application is related to the subject matter of provisional application U.S. Ser. No. 60/337,177 filed Dec. 10, 2001, assigned or under obligation of assignment to the same entity as this application, from which application priority is claimed for the present application. Provisional application U.S. Ser. No. 60/337,177 is incorporated herein by reference in its entirety.

BACKGROUND OF THE INVENTION

The invention relates generally to improving liquidity for equity interests that cannot be efficiently monetized, by dividing up the cash flows from the equity interests and efficiently distributing them among different classes of investors.

Interests in private, Alternative Investment Funds ("AIFunds") can be highly illiquid. As used herein, Alternative Investment Funds ("AIFunds") include, but are not limited to, equity interests in private equity funds; hedge funds; leveraged buy-out funds; venture capital funds; partnerships; real estate investment trusts; as well as positions in illiquid assets such as real estate, or stock in private companies, for example.

Investors expect that higher returns will compensate them for this illiquidity. For example, many general partners (GPs) raise capital from limited partners (LPs) for their AIFunds. The GP uses his expertise to invest the funds, seeking a high return. Each fund will typically be invested in a portfolio of interests. Much of the economic value GPs contribute for AIFunds is connected with their willingness to make illiquid investments. Such investments are only possible because LPs have committed their funds for extended periods. GPs usually earn a management fee, and a carry, i.e., a portion of the profit earned on invested funds.

LP investors are typically institutional investors and wealthy individuals. LPs generally expect returns from AIFunds of as much as twenty percent per year. However, actual returns from AIFunds are highly variable. Cash flow will generally be distributed after a realization event, such as the sale of a company or an initial public offering (IPO). LP distributions can be made over a long period of time and the timing is unpredictable.

Today, there are an enormous number of LPs that would like to reduce their exposure to AIFunds. However, none of their options are attractive. The buy-side of the market for participations in AIFunds is developing, but at this point, there is still a substantial imbalance with much greater sell side pressure. Historically, the market for participations was quite thin, with brokers attempting to match buyers and sellers for particular positions. Today, the chief buyers for the Primary Fund participations are the new funds raised to purchase secondary market participations ("Secondary Funds"). Such funds offer diversification across many different funds, industry groups and vintage years. Billions of dollars have been raised for Secondary Funds, but bids for Primary Fund participations are still quite low. To understand why, it is useful to think through the process. There is substantial inefficiency at every step.

First, the market for AIFund participations is small and inefficient. An excellent measure of market efficiency is bid/asked spreads. Characteristic of small, illiquid markets with little transparency, bid/asked spreads in the AIFunds market are very wide.

Second, selling pressure has overwhelmed investor demand for AIFund participations. The general drop in equity prices has hurt all investors. However, technology has been particularly hard hit, and those seeking high returns in technology are the same investors who purchased participations in AIFunds. Having entered with great optimism, expecting high returns, these investors now are confronted with very heavy losses from technology, a much higher percentage of 'alternative investments' than is prudent, and much constrained liquidity. The order imbalance for AIFund participations is manifest in various ways. Most AIFund GPs mark their positions to market, but bids for purchasing those positions are usually at a substantial discount to the GP Net Asset Values ("NAVs"). The discounts systematically exceed by a wide margin any unwarranted optimism of fund managers. A buyer pricing an AIFund participation starts with a bottoms-up analysis of direct investments to determine future cash flows. Obviously, projecting cash flows is a very subjective process that is likely to be influenced towards excessive caution by the large sell-side overhang. New AIFunds have a typical expected return of high teens to 20%. One of the most active current purchasers of AIFund participations acknowledges that its prices for participations are computed to yield investors in its Secondary Fund 25% returns, after fees. This Secondary Fund manager freely admits that even when it agrees that the GP has fairly priced AIFund participations, it consistently bids substantially less than GP valuations.

An additional inefficiency is that much of the new liquidity for AIFund participations is illusory. At any given time, there is a limited pool of money available to purchase alternative investments. Though Secondary Funds are being sold, very few new investors are being drawn into the AIFunds market. Instead, the ownership is simply being shifted from weak hands to stronger hands. Secondary Funds have not changed the risk characteristics of AIFund investments in a way that will bring in new investors. That is, "strong hands" might be characterized as an individual or entity that can maintain the illiquid investment of an AIFund for substantial return in the future, i.e., possible years in the future. In contrast. "weak hands" might be characterized as an individual or entity that was overly optimistic in investing in an AIFund, and needs liquidity before his investment is returned from the AIFund. This can be true even though the weak hands know that long term profits would be substantial, i.e. if they were not forced out by their immediate short term liquidity needs.

To explain further, prior to the fall in markets of the recent past, it can be assumed that 'strong hands' held an optimal amount of AIFund investments. With the unexpected fall in equity markets, their ownership of AIFunds was pushed towards a sub-optimally large percentage. Notwithstanding, the 'strong hands' held their positions because the risk-adjusted cost of selling was too high, i.e., their expected return of the marked down positions compensated for the incremental risk.

Secondary Funds are sold almost exclusively on the basis of price. The same 'strong hands' are now buying into the new Secondary Funds because the expected returns are high enough to compensate them for a larger then normal concentration in AIFunds. Expected returns must overcome their risk of excessive concentration. Despite relative inelasticity of demand, if the price gets cheap enough, buyers will be attracted.

A further inefficiency of Secondary Funds is that AIFunds offer little transparency into the value of participations. Each fund has numerous individual investments, for which only the GP has full information. In addition, only the GP can control the timing of liquidity events. In the absence of control or information, buyers of AIFund participations must build in a large risk premium for their uncertainty.

Yet an additional inefficiency is that new Secondary Funds impose a second layer of fees. Secondary Fund GPs must compete with normal AIFunds for investors. The assets of primary AIFunds and Secondary funds are very similar, and Secondary Fund GPs must be compensated. As a result, bids for AIFund participations fully discount Secondary Fund fees, i.e. sellers of AIFund participations are likely to bear the full cost of GP fees for the Secondary Funds.

A further difficulty is that investors are reluctant to take losses. Recognizing losses is difficult for all investors. Crystallizing the realization of losses is a discipline that is hard even for seasoned traders. Institutional holders are very much affected by the accounting consequences of selling participations at a loss. The consequence is that investors postpone recognition of losses as long as possible. When investors have no choice but to lighten up their investments in AIFund participations, frequently they must raise cash quickly.

Furthermore, recently proposed arrangements have very limited value. Currently, there are a number of arrangements to mitigate the immediate accounting consequences of getting liquidity for AIFund positions. Usually, the result is that losses are spread over a period of years instead of being taken all at once. However, the true economic cost is not diminished.

An additional difficulty arises because GPs are reluctant to approve transfer of LP ownership interests. GPs must usually approve all transfers of ownership for participations. GP's have several disincentives to approve such transfers. One disincentive is that transfers of LP interests directly compete for investors with future sales by the same fund managers. If a AIFund approves a transfer, that AIFund loses the opportunity to sell a future fund to an investor that likes a specific fund manager.

A further disincentive is that many funds would like to keep performance information closely held among their existing investors. Transfer of participations distributes more widely that information. This is particularly sensitive now, because it is the performance of their least successful funds that will likely become better known. A yet further disincentive for a GP to approve such transfers is that many funds like to foster the notion that their LPs form a tight, exclusive group. GP's want investors to believe there is scarcity value to their funds and that it is a privilege to be able to invest with them. Remarketing of participations reduces that exclusivity a lot.

A further difficulty arises because the new Secondary Funds have very specific investment criteria. The new Secondary Funds must distinguish themselves from AIFunds. One means is to focus on the excess returns available because of the market imbalance. However, another big selling point is the fact that Secondary Funds are largely invested, and return of capital is expected much quicker than for primary AIFunds. Typical Secondary Funds seek on average to buy participations that are at least 70% funded. With the run up of the markets, the amount of capital invested in AIFunds rose exponentially in recent times. In addition, many of the funds raised since 1999 are viewed as suspect by investors, fearful that GPs bought positions at inflated values. AIFunds raised since 1999 far exceed the size sold earlier. Many of the recent funds are less than 50% committed. Thus, a substantial percentage of Primary Fund participations do not fit the criteria for purchase by Secondary Funds.

Finally, the origination and distribution costs for Secondary Funds are high. Raising funds is always costly, and despite the selling pressure, it is expensive to acquire assets for Secondary Funds. Buyers of secondary participations must: i) carefully evaluate each of the underlying positions and project their cash flow, with little direct information; ii) overcome the reluctance of investors to recognize losses, and their sticker shock at the bid; iii) obtain the GP's approval to transfer of participation ownership; and iv) attract new investors into a distressed sector of the market.

As a result of these known difficulties and inefficiencies, various solutions have been proposed for addressing the liquidity problem. To date, the market has offered just a few mechanisms to provide AIFund investors with liquidity: i) at great cost, brokers match buyers and sellers for individual participations; ii) more recently, Secondary Fund GPs buy AIFund participations for their funds; iii) occasionally, buyers have offered arrangements that either mitigate the accounting impact of losses, permit participation sellers to retain and shape some residual risk position; and iv) a very few leveraged transactions were placed that included one debt tranche supported by an insurance wrap, with the remaining portion constituting leveraged equity in AIFund participations. The latter transactions have not been successful recently for lack of buyers of the leveraged equity piece.

Recently, a new arrangement, the principal protected note, has been brought to market. The appeal of this product is chiefly regulatory arbitrage. Through an economically inefficient ruse, investors are able to pretend that potentially high yielding AIFund investments are high quality debt instruments. A recent example is a $500 MM 15-year note incorporating an insurance wrap (essentially, 50% downside protection of the portfolio value) that will permit domestic insurance companies to carry their investment based on the regulatory capital of a AAA note. Investors receive exactly the return of the AIFund cash flows, less the premium paid to the insurance company.

Unless new investors are brought to the AIFund participation market, the sell-side pressure will grow even greater. There will be increasing competition for the few 'strong hands' buyers left standing. To compensate for increasing concentration risk, with each new purchase, remaining buyers will raise their investment hurdle rate. Price has been and will continue to be the only means of attracting investors.

AIFunds have been discussed above and liquidity problems associated with those AIFunds. Problems are also present, in known techniques, with AIFunds in the corporate context. To explain, in accordance with further aspects of the Background of the Invention, corporations typically have a corporate capital structure that permits different types of loans, such as loans secured with assets, unsecured loans, subordinated loans, etc. From an equity perspective, there can be common and preferred stocks. The rights and entitlements of each class of equity can be quite variable regarding such issues as voting, conversion, control and preference. Creation of new preferred stock requires issuer participation, and is complicated because the approval of all securities subordinated by the new issue must usually be sought.

Further, the underlying asset for CDOs, CLOs and CMOs (collatorized debt obligations, collatorized loan obligations and collatorized mortgage obligations), for example, may typically be a portfolio of various debt instruments. The priority/tranche technology was developed to finance these portfolios more efficiently, i.e., wherein the underlying assets are debt. Instead of selling the generic, bundled exposure of the debt portfolio, different classes of investors, each with different risk reward and/or investment outlooks are offered interests tailored to their particular preferences. The aggregate cash flow arising from the portfolio of debt in the securitized issue is distributed based on a "waterfall" of priorities. Each separate cash flow "tranche" has a given priority of claims regarding repayment, e.g. the senior most tranche might have a rating of AAA, while the junior most might have the risk characteristics of junk bonds or equity. However, various shortcomings exist with known techniques in the situation when a general partner of an Alternative Investment Fund desires liquidity, but cannot borrow against stock pursuant to Alternative Investment Fund powers.

In view of the deficiencies in the solutions described above, a method and system is needed for efficiently introducing liquidity into AIFund investments.

SUMMARY OF THE INVENTION

In accordance with one embodiment, the invention provides a method and system for providing liquidity to an AIFund. The transaction system may include a plurality of fund investors; an Alternative Investment Fund in which the fund investors commit to the investment of "Alternative Investment Funds," the Alternative Investment Fund managed by a fund manager; a structure operated in conjunction with the Alternative Investment Fund, the structure managed by a structure manager; and a plurality of structure investors, the structure investors investing structure funds into the structure. The structure provides at least one fund investor with an option to designate cash distributions of the Alternative Investment Fund, which are made available to the at least one fund investor, to the structure. In the system the at least one fund investor obtains a liquidation of Alternative Investment Funds upon the designation of the cash distributions of the Alternative Investment Fund.

In one aspect, the invention provides a method for providing liquidity to an alternative investment fund, the method comprising: providing a set of contractual obligations to enforce an agreement that improves the liquidity position of an entity; and effecting the flow of value, based on the contractual obligations, by assuring that certain value flowing, arising from an alternative investment interest controlled by the entity, will be diverted to the benefit of a liquidity provider.

In a further aspect, the invention provides a transaction system for providing liquidity to an alternative investment fund, the transaction system comprising: a plurality of fund investors; an alternative investment fund in which the fund investors commit to the investment of alternative investment funds, the alternative investment fund managed by a fund manager; a structure operated in conjunction with the alternative investment fund; a plurality of structure investors, the structure investors investing structure funds into the structure; and the structure providing at least one fund investor with an option to designate cash distributions of the alternative investment fund, which are made available to the at least one fund investor, to the structure; wherein the at least one fund investor obtains a liquidation of alternative investment funds upon the designation of the cash distributions of the alternative investment fund; and wherein the structure pools the designation of cash distributions of the alternative investment fund, which are made available to the at least one fund investor, with interests in cash flows from other alternative investment funds.

BRIEF DESCRIPTION OF THE DRAWINGS

The present invention can be more fully understood by reading the following detailed description together with the accompanying drawings, in which like reference indicators are used to designate like elements, and in which:

FIG. 2 is a flowchart showing a transaction process in accordance with one embodiment of the invention;

FIG. 3 is a flowchart showing further details of the "General Partner of Structure forms Structure" step of FIG. 2, in accordance with one embodiment of the invention;

FIG. 4 is a flowchart showing further details of the "Structure's GP performs various formation tasks" step of FIG. 3, in accordance with one embodiment of the invention;

FIG. 12 is a diagram showing further aspects of the "participants" of FIG. 11 in accordance with one embodiment of the invention;

FIG. 13 is a diagram showing further aspects of the "assets" of FIG. 11 in accordance with one embodiment of the invention;

FIG. 14 is a diagram showing further aspects of the "contracts" of FIG. 11 in accordance with one embodiment of the invention;

FIG. 15 is a diagram showing further aspects of the "transactions" of FIG. 11 in accordance with one embodiment of the invention;

FIG. 16 is a diagram showing further aspects of the "liquidity facility" of FIG. 11 in accordance with one embodiment of the invention;

FIG. 17 is a diagram showing further aspects of the "additional Structure provisions" of FIG. 11 in accordance with one embodiment of the invention;

DETAILED DESCRIPTION OF THE INVENTION

Figure 1:
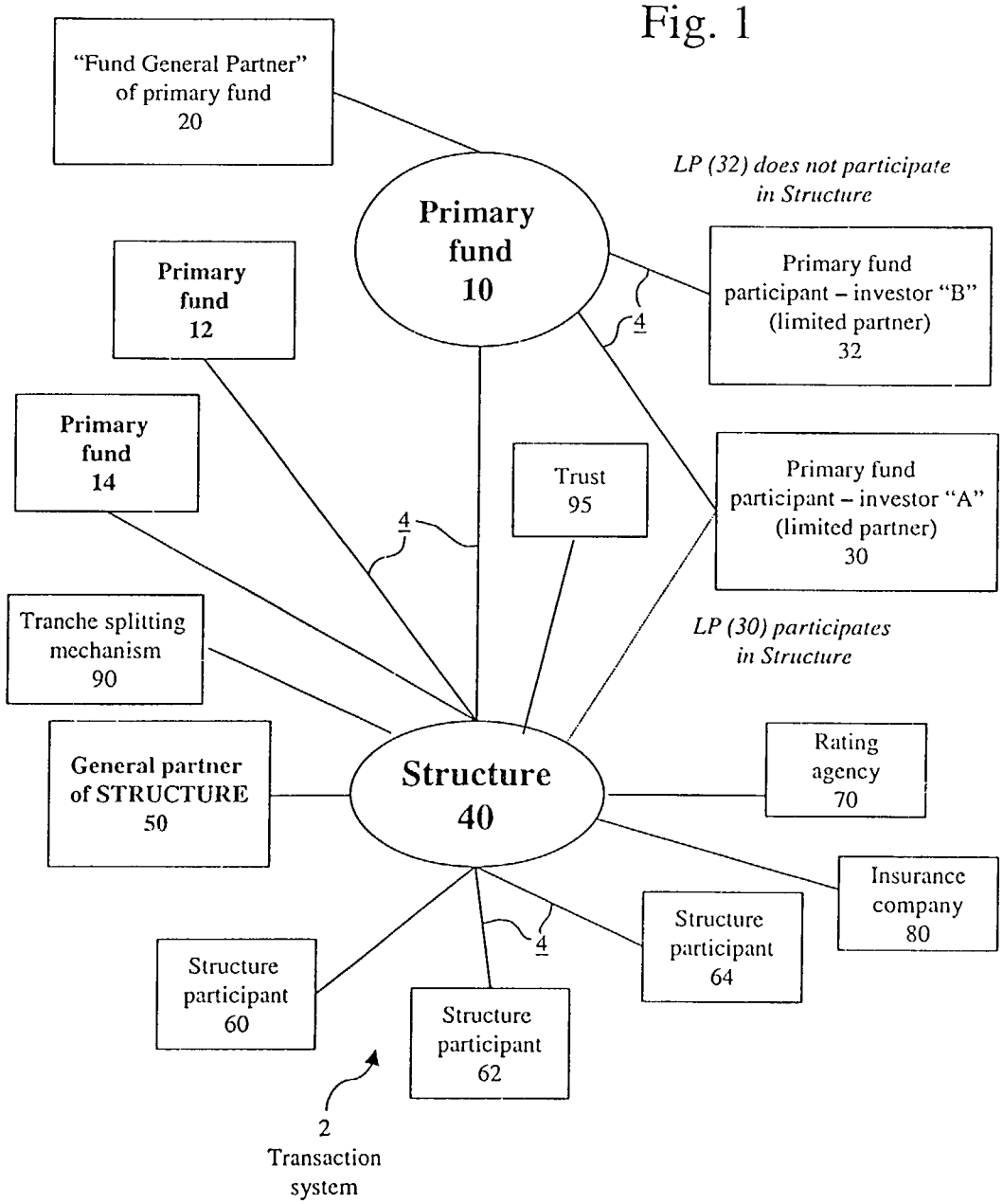
FIG. 1 is a block diagram of a transaction system showing aspects of a Structure in accordance with one embodiment of the invention.

Hereinafter, aspects of a transaction system in accordance with various embodiments of the invention will be described.

As used herein, any term in the singular may be interpreted to be in the plural, and alternatively, any term in the plural may be interpreted to be in the singular. The systems and methods of the invention are directed to the above stated problems, as well as other problems, that are present in conventional techniques.

The invention relates generally to improving liquidity for equity interests that cannot be efficiently monetized and/or maximizing the value when liquidating, i.e., selling out, such positions, by dividing up the cash flows from the illiquid equity interests and efficiently distributing them among different classes of investors. In addition, the invention takes advantage of the efficiencies provided by aligning the interests of the liquidity provider with the interests of the entity in control of the underlying assets, whether such entity is the beneficial owner or not. The systems and methods of the invention also provide for how to assure that non-participating beneficial owners of underlying assets are not prejudiced by the alignment of interests between the participating beneficial owners and the entity in control of the underlying assets. The systems and methods of the invention are very flexible and will support a myriad of provisions that can optimize the economic interests among all the parties involved.

In addition, the invention relates to a system and method to improve the efficiency of such arrangements. An aspect that makes such transactions particularly difficult is that very little information about the underlying assets is publicly available. For AIFunds managed by professionals on behalf of beneficial owners, rarely do investors have much information about the individual AIFund investments. Liquidity providers can substantially reduce their risk and expense by engaging with and gaining the support of general partners of the underlying funds, or principals that manage or control the illiquid assets, to facilitate directly or indirectly the transactions.

In addition, the invention relates to a system and method to facilitate the most economic financing for the liquidity provider. The liquidity provider may assemble a large and diverse pool of such illiquid interests, and seek insurance and/or a rating in order to finance that position in the most economic fashion.

In addition the invention relates to a system and method to permit tax-exempt investors to obtain liquidity without incurring debt. The systems and methods of the invention provide various other advantages not provided by conventional techniques.

As set forth herein, the systems and methods of the invention are described in the context of an Alternative Investment Fund (AI Fund). To further describe the nature of an Alternative Investment Fund, many investments offer essentially immediate liquidity. Stocks, bonds, commodities, currencies, futures and options can be bought and sold at any time. One can also borrow against such assets quite easily through brokers. Many asset managers offer similar liquidity, mutual funds can generally be redeemed each day. However, there is a class of investment opportunity that requires a great deal more patience. While day traders can churn their holdings, sometimes several times in a single day; some market dislocations can take months or even years to unfold. Further, investments broadly accessible to many investors rarely yield high returns. Trading in illiquid instruments or making investment bets with long time horizons demands investors willing to commit money for lengthy periods of time. In such circumstances, investors must trust managers a great deal: bid/asked spreads are high; market values are at best indicative, until there is a realization event; information about investments is frequently not publicly available; and, complexity often prevents all but principals from understanding the investment bets. Few investors can make such long-term commitments, and thus more attractive returns are available to investors willing to accept some degree of illiquidity. Illiquidity is characteristic of many equity investments, including: private equity, LBOs, venture capital, and hedge funds, real estate investment trusts, and simple investments in private companies. Broadly, AIFunds are by definition illiquid investments. Further, "illiquid investments" means that an investor cannot obtain the liquidity that the investor needs in a timely basis.

Two examples of how the invention might be employed will illustrate the value of the invention. In accordance with one embodiment of the invention, the invention provides liquidity to holders of participations in AIFunds. In accordance with a further embodiment described below, the invention provides liquidity to holders of equity positions in private companies, using what may be characterized as "Synthetic Preferred Stock."

In accordance with the purposes of the invention as embodied and broadly described herein, there is provided a method and system for introducing liquidity into the market for AIFund participations.

The proposed transaction (the "Structure"), in accordance with one embodiment of the invention, fundamentally alters the characteristics of AIFund participations to attract new and more efficient investors to the market, in accordance with one embodiment of the invention. That is, the invention will be herein described in terms of a "Structure." As used herein, "Structure" means a transaction, that might utilize a trust, a set of contractual obligations and/or some other understanding to enforce an agreement that improves the liquidity position of an entity, by assuring that certain value flowing, for example cash flow, arising from equity or other AIFund interests controlled by such entity will be diverted to the benefit of a Liquidity provider.

The Structure can access debt investors to fund a portion of the capital required to purchase the AIFund cash flows. Separately, or in combination with debt, the Structure can take advantage of the insurance market as well. Illustratively, there are two main features in accordance with aspects of the invention. A portion of the AIFund ownership can be left with current investors (avoiding the difficult sale in the current market of leveraged AIFund equity) while offering investors substantial liquidity. Alternatively, at some point in the future, it might be that all tranches in the trust could be sold to third parties, leaving the original owner of the participation with no residual interest. Further, in the method of the invention, AIFund GPs are given a novel role that is highly efficient. To date, the only active involvement by AIFund GPs in providing liquidity to LPs has been agreement to the assignment of participations. The Structure of the invention leverages each GP's: (i) ability to minimize financing cost of a senior undivided equity interest, by providing proprietary historical return data from their respective fund groups; (ii) intimate understanding of their AIFund investments, risks and liquidity options; and, (iii) longstanding, preexisting, trusted relationships with their respective LPs, to originate senior equity interests, for example.

FIG. 1 is a block diagram showing a transaction system 2 in accordance with one embodiment of the invention. The transaction system 2 revolves around the Structure, i.e., the transaction of the invention. As shown in FIG. 1, the transaction system 2 includes one or more primary funds (10, 12, 14), a General Partner 20 of the primary fund, and various investors (30, 32) of the primary fund. Further, the transaction system 2 includes a General Partner 50 of the Structure and various Structure participants (60, 62). Each of the components of the transaction system 2 play a role in the Structure, i.e., play a role in the transaction provided by the Structure.

It should be appreciated that one or any number of primary funds might be involved. The primary funds (10, 12, 14) interact within the Structure 40. For purposes of illustration, FIG. 1 refers to a primary fund 10 and its interaction within the Structure 40. The primary fund 10 could be in the form of a private equity fund, for example. However, the systems and methods of the invention may work with any type of AIFund.

FIG. 1 also shows that the transaction system 2 may include a trust 95, or alternatively a set of contractual provisions, for example. Further aspects of this controlling mechanism are described below. Hereinafter, further details of the primary fund 10 will be described. However, it is to be appreciated that the primary fund 12 and the primary fund 14 interact with the Structure 40 in a similar manner.

As shown in FIG. 1, the primary fund 10 is managed by a Fund General Partner 20 of the particular primary fund. Further, FIG. 1 illustratively shows two limited partners of the primary fund 10, including primary fund participant 30 and primary fund participant 32. However, there may well be, and typically are, numerous other limited partners.

FIG. 1 also shows that the Structure 40 is associated with a General Partner 50 of the Structure 40. The General Partner 50 manages the Structure. In accordance with one aspect of the invention, the General Partner 50 of the Structure actively works with the General Partner 20 of the primary fund to effect operation of the Structure 40. That is, the General Partner 50 of the Structure and the General Partner 20 of the primary fund work together to maximize the benefit that the Structure 40 can provide to the primary fund 10 and its LPs.

The transaction system 2 of FIG. 1 also includes representative Structure participants (60, 62 and 64). There may of course be, and typically are, numerous other Structure participants. The Structure participant 60, as well as the primary fund participant 30, might be an individual, an institution, or some other entity, for example.

The transaction system 2 of FIG. 1 also includes a rating agency 70. In accordance with one embodiment of the invention, the Structure 40 may rely on rating agency evaluations from rating agencies 70 to attract financing. Aspects of the rating agency 70 and its interaction with the Structure 40 are described below. Further, the transaction system 2 might include an insurance company 80, which might be used to provide an insurance wrap against the assets of the Structure 40, as described below.

As shown in FIG. 1, the transaction system 2 further includes a tranche splitting mechanism 90. The tranche splitting mechanism 90 is responsible for splitting the cash flows of equity interests, which flow from the primary fund 10, within the transaction provided by the Structure. To explain further, the person, for example, such as the General Partner 50 of the Structure, cannot typically be trusted to have both beneficial interests in the assets of the Structure, and to split out the cash flows in the appropriate fashion. Such an arrangement would go against trust concerns. As a result, the tranche splitting mechanism 90 provides a mechanism by which the General Partner 50 of the Structure, for example, does not split out the cash flows. Accordingly, trust concerns are satisfied. The tranche splitting mechanism 90 might be an unbiased person or some type of unbiased arrangement, for example.

As a practical note, as shown in FIG. 1, the various individuals, the various funds and the Structure might be connected over a suitable network using suitable processing systems. For example, the Internet might be utilized. However, it is appreciated that the various components of the transaction system 2 of FIG. 1 do not have to communicate over a network. Rather, other forms of communication might be utilized.

The Structure 40 of the invention fundamentally alters the characteristics of primary fund participations to attract new and more efficient investors to the market. The Structure 40 can access debt and reinsurance markets (using ratings and/or insurance wraps) to fund purchase of Primary Fund cash flows. At least two main differences distinguish the Structure 40 from previous solutions. Firstly, a portion of the Primary Fund ownership is left with current investors (avoiding the difficult sale of leveraged AIFund equity) while offering LPs 30 substantial liquidity; and secondly, Primary Fund GPs 20 are given a novel role that is highly efficient. To date, the only active involvement of Primary Fund GPs has been to approve transfer of participation ownership interests. The Structure 40 leverages the longstanding, preexisting, trusted relationship Primary Fund GPs 20 have with their respective LPs 30.

Partnership with GPs 20 offers many benefits, including: i) GPs 20 are the most direct and efficient means to connect with LPs 30; ii) each GP 20 has all available information about its fund investments, and thus is in the best position to manage their risk; iii) the GP 20 must approve any transfer of LP participation ownership interests; and, iv) the GP 20 is in the best position to enforce assignment of certain cash flows from their LPs 30 to the Structure 40. It should be appreciated that the "partnership" between a GP 20 and the Structure GP 50, as described herein, is an affiliation or working relationship, rather than a "legal" relationship.

Instead of simply re-offering some form of participation in AIFunds, the Structure 40 can be funded using debt instruments, thus accessing new sources of funds. Restructuring the instrument permits the market for AIFund risk to be broadened substantially. Over the last decade, the sophistication related to structured finance has improved immensely. The underlying assets for CMOs, CLOs, CDOs, and receivable financing structures all produce cash flows. The rating services, investors and reinsurers have developed a lot of expertise in analyzing the relative riskiness of different tranches of those cash flows.

The Structure's GP 50 will purchase and pool interests in the first cash flows from Primary Fund participations. The reinsurance and debt markets are extremely deep and efficient. The Structure 40 takes advantage of broad and deep markets to improve the efficiency of the secondary market for Primary Fund participations. By restructuring the investment, buyers of commodity risk products can be brought in on the basis of a very narrow bid/asked spread. Instead of relying on the narrow group of strong hands investors in AIFunds, the Structure 40 facilitates access to the reinsurance and debt markets. The successful Structure 40 will reduce the selling pressure on Primary Fund participations.

In accordance with one embodiment of the invention, the Structure 40 may incorporate several features: i) a pool of participations may be purchased with diversity of type, industry, geography and vintage year; ii) only a fractional amount of any individual investor's participation in an AIFund may be purchased, usually less than 30% of its FMV; iii) at present such purchases may be of the first cash flows returned from the underlying Primary Fund participations; iv) the Structure's GP 50 may fund from the outset, and could provide a guarantee for any unfunded LP commitments to the AIFund; and vi) capital returned before all commitments are funded may first be used to offset Structure investments. The Structure GP 50 may purchase an insurance wrap against its assets, in accordance with one embodiment of the invention. Together with Structure equity, the wrap might support a credit rating permitting the Structure GP 50 to fund most of the Structure 40 with debt instruments such as commercial paper rated A1/P1. The benefits of the Structure 40 are evident when compared to the current liquidity alternatives for LPs 30 in AIFunds.

Surprising to many is the fact that the first cash flows from an equity portfolio may have the same risk as a high-grade debt instrument, while the bottom tranche of a portfolio of debt might have the risk characteristics of equity. By leveraging this understanding, a whole new class of investors can be drawn to provide liquidity for the AIFunds market.

The market for AIFunds is tiny by comparison to the reinsurance and debt markets. Broadening the appeal for a slice of the AIFunds market will help to address the huge order imbalance in a way that relies less on pure price to attract investment.

With a 30% loan-to-fair market value (FMV) ratio, proper diversity and quality, the first tranche cash flows from Primary Fund investments can attain the risk characteristics of investment grade debt. However, because fixed income buyers are not adept at analyzing cash flows from AIFunds investments, the Structure 40 will likely rely on evaluations from rating agencies 70 to attract investors, in accordance with one embodiment of the invention. Such ratings will depend either on a previously negotiated structured vehicle, or an insurance wrap policy.

Further, by including Primary Fund GPs 20 as partners in the Structure 40, maximum transparency into the valuation of underlying AIFunds investments is achieved. By properly aligning the interests of the Primary Market GPs, Structure investors 60 will be assured that all information pertinent to proper risk management will be available. The Structure 40 will recognize contributions by Primary Market GPs 20, but in a manner that will assure the GP has strong incentive to minimize risks, and maximize returns to investors in the Structure 40, e.g. profits due to Primary Fund GPs 20 might be subject to a hold back against first loss exposure associated with each GP's 20 own fund(s).

The Structure 40 should also reduce the second layer of GP fees. By partnering with Primary Fund GPs: less expertise is required to manage the risks of the Structure 40, than to manage the risks for a Secondary Fund, as described above; the cost of acquiring participation interests will be reduced substantially; and, the Structure 40 will not have to seek permission from the Primary Fund GPs 20 to transfer the participation.

The Structure 40 liquidity does not require LP investors 30 to realize losses currently. From an investor's perspective, the Structure 40 appears to be a financing of the LP investor's 30 Primary Fund investment on favorable terms. Investors need not crystallize any loss on their participations. In fact, if the participations ultimately produce the originally expected returns, the investor will usually realize that return.

How is such magic achieved? The fact is that the Primary Fund investors increase their risk exposure by giving up the lower risk, first cash flows from their participations. However, by leveraging the efficiency of the debt and reinsurance markets, the investor can minimize the incremental risk, while retaining the possibility that he can obtain his original expected return.

Weak hands always seem to be forced to liquidate their positions at the absolute worst time. The transaction afforded by the Structure 40 provides investors with the opportunity to gain 30% liquidity, for example, against the current value of their Primary Fund investments, while efficiently retaining the upside in his investment. Many believe the equity market is currently near its nadir. The Structure 40 will provide Primary Fund investors additional liquidity to hold on longer, offering additional time to allow the market to improve.

The Structure 40 avoids GP 20 concerns over transfer of participation ownership interests. The Structure will not: i) cannibalize the market for future AIFunds; ii) substantially expand distribution of proprietary information; and iii) dilute the exclusivity of the GP's brand image. Distribution costs are minimized by enlisting the assistance of Primary Market GPs.

In further explanation of the invention, FIG. 2 is a high-level flowchart showing the process in accordance with one embodiment of the invention. As shown in FIG. 2, the process starts in step 100 and passes to step 200. In step 200, the Fund General Partner (20) forms the primary fund. After step 200, the process passes to step 300. In step 300, the Structure General Partner (50) forms the Structure 40. Then, the process passes to step 400.

In step 400, the Fund GP and Structure GP solicit for investments. It should of course be appreciated that the particular timing of the events shown in FIG. 2 might vary substantially. For example, a particular primary fund 10 might be formed years in advance of the Structure 40, which works with the particular primary fund 10. As a result, the General Partner 20 of the primary fund 10 could of course solicit investments in the primary fund 10 years in advance of the Structure General Partner 50 soliciting for investments in the Structure 40. However, in accordance with this illustrative embodiment of the invention, the primary fund 10 is formed concurrently or after the Structure 40. As a result, an investor 30 interested in the primary fund 10 may be more attracted to the primary fund 10, i.e., as a result of the enhanced liquidity that the Structure 40 provides.

After step 400 of FIG. 2, the process passes to step 500. In step 500, the Investor (30, 32) considers the provisions of the primary fund 10. Then in step 510, the investor (30, 32) decides to invest in the primary fund, and as a result, becomes what may be characterized as a "primary participant". The investor (30, 32) may typically be a limited partner dealing with the general partner 20 of the primary fund 10.

After step 510, the process passes to step 520 in which the investor 30, for example, effects an investment in the primary fund 10. This investment may be in the form of monies transferred to the primary fund 10 and/or a commitment by the investor 30 to the General Partner 20 of the primary fund.

As shown in FIG. 2, in step 530, time passes by and the primary fund participant 30, i.e., the investor 30, seeks liquidity from its interest in the primary fund 10. As a result, in step 600, the primary fund participant 30 may consider the provisions of the Structure as a mechanism to achieve liquidity. Then, in step 700 of FIG. 2, the investor 30 indeed proceeds to utilize the Structure. After step 700, the process passes to step 800.

In step 800, a potential "Structure participant" 60 considers investment in the Structure 40. It is noted that there is not a direct relationship between step 700 and step 800 in that the Structure 40 may involve numerous other contributions from primary funds, i.e., in addition to the contribution to the Structure 40 by the primary participant 30. Further, in step 800, the Structure participant 60 decides to effect an investment in the Structure.

After step 800 as shown in FIG. 2, the process passes to step 900. In step 900, the Structure 40 operates. Further details of step 900, as well as other steps of the process of FIG. 2, are described below. After step 900, the process passes to step 970. In step 970, the process ends.

FIG. 3 is a flowchart showing further details of the "General Partner of Structure (50) forms Structure (40)" step 300 of FIG. 2, in accordance with one embodiment of the invention.

As shown in FIG. 3, the sub-process passes from step 300 to step 310. In step 310, the General partner (GP) 50 of the Structure obtains the agreement of the fund GP to his collaboration in offering the Structure, and drafts the various provisions of the Structure. These provisions are illustratively shown in FIG. 3. However, it should of course be appreciated that various other provisions or considerations might be involved in the formation of the Structure. Further, it should be noted that the Structure GP might in fact play the role of the Fund GP, as described herein. Further, the Fund GP might in fact play the role of the Structure GP.

In further explanation of the Structure provisions, for example, the Structure provisions might include that: (1) The Structure's GP purchases and may pool interests in the cash flows from primary fund participations to form the Structure; (2) The interests in the pool may be homogeneous, from a single primary fund or can be Participations having diversity of type, industry, geography and vintage year; (3) The Structure GP may buy one or more tranches of the cash flows returned from the underlying primary fund participations; (4) the Structure's GP (50) may fund from the outset, pay over time, and/or provide a guarantee for any unfunded AIFund LP commitments; and (5) the Structure GP may seek to securitize Structure assets, either homogeneous or a diversified pool. The Structure equity, with or without an insurance wrap, may support a credit rating permitting the GP cheaply to fund a portion of the Structure with debt instruments such as commercial paper rated A1/P1.

After step 310 of FIG. 3, the process passes to step 320. In step 320, the Structure's GP (50) performs various formation tasks. Further details of step 320 are described below with reference to FIG. 4.

After step 320 of FIG. 3, the process passes to step 330. In step 330, the process returns to step 400 of FIG. 2.

FIG. 4 is a flowchart showing further details of the "Structure's GP (50) performs various formation tasks" step of FIG. 3, in accordance with one embodiment of the invention.

The process of FIG. 4 starts in step 320, and passes to step 322. In step 322, the GP (50) of the Structure selects the primary funds (10, 12, 14, etc.) that may contribute to the Structure. The expertise and experience of the fund General Partner 20, the actual investments made, as well as any of a wide variety of other criteria, may be used in the selection of the particular primary funds that are chosen for the Structure. Then in step 324, the Structure GP together with input from the respective Primary Fund GPs, analyzes the risk associated with the cash flows of the chosen primary funds that contribute to the Structure. However, as noted above, the General Partner 50 of the Structure does not perform the splitting of the cash flows into the different tranches. After step 324, the process passes to step 325. In step 325, based on the risk assessment at the time of investment, the Structure GP determines, for this simple embodiment, the appropriate combination of "advance rate" (preference amount) and "senior undivided equity interest" dividend rate for each new Structure investment, in accordance with one embodiment of the invention.

Then in step 326, The GP of the Structure may or may not purchase an insurance wrap against the assets of the Structure based on the risk assessment, and whether he decides to securitize a portion of the Structure's funding requirements. Then in step 328, if the GP of the Structure decides to do a securitization, the GP of the Structure submits the Structure information to a rating agency 70 for evaluation. The rating agency 70 performs the evaluation.

After step 328 of FIG. 4, the process passes to step 329. In step 329, the process returns to step 330 of FIG. 3.

Figure 5:
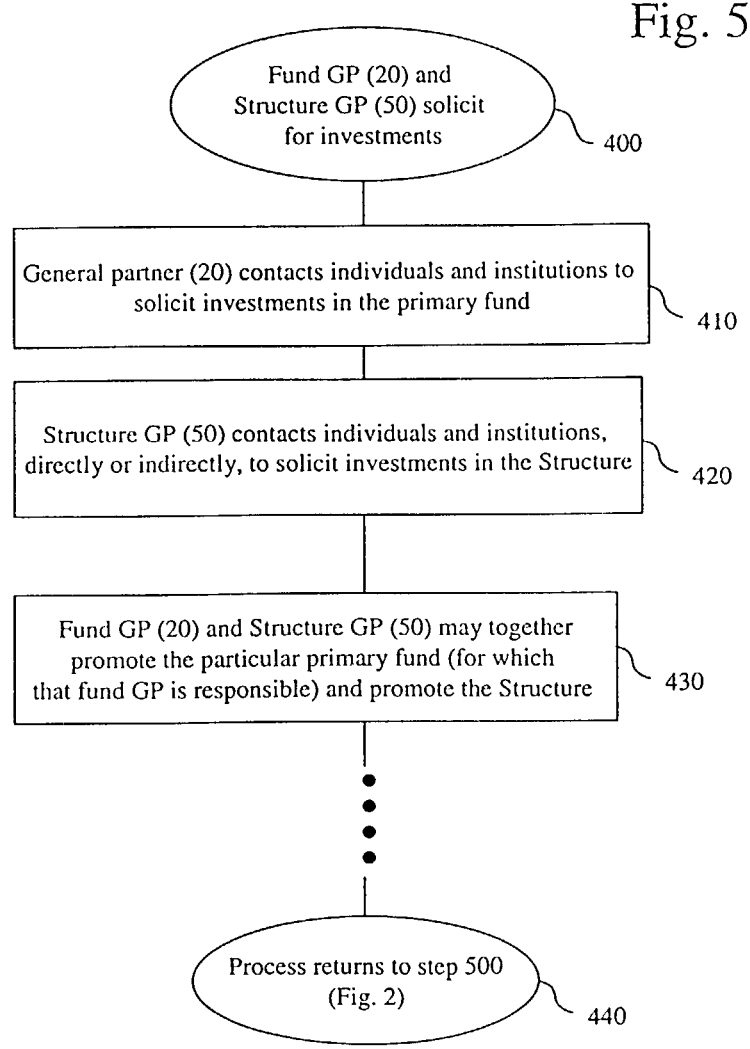
FIG. 5 is a flowchart showing further details of the "Fund GP and Structure GP solicit for investments" step of FIG. 2, in accordance with one embodiment of the invention.

FIG. 5 is a flowchart illustratively showing further details of the "Fund GP (20) and Structure GP (50) solicit for investments" step 400 of FIG. 2, in accordance with one embodiment of the invention.

The process of FIG. 5 starts in step 400 and passes to step 410. In step 410, the General partner (20) contacts individuals and institutions for example, based in long term contacts, for example, to solicit participation in the primary fund. This solicitation by the General Partner 20 of the primary fund may promote the particular primary fund by using the enhanced liquidity afforded (to the primary fund) by the Structure 40. After step 410, the process passes to step 420.

In step 420, the Structure GP (50) contacts individuals and institutions, based on long term contacts, and/or publicly advertises, so as to solicit participation in the Structure. As described above, the nature of investment by a Structure participant 60 is substantially different than an investment by a primary fund participant 30. Accordingly, it is appreciated that the appropriate techniques by which the General Partner 20 of the primary fund and the General Partner 50 of the Structure solicit investment may well be different. After step 420, the process passes to step 430.

In step 430, the Fund GP (20) and Structure GP (50) may together promote the particular primary fund (for which that fund GP is responsible) and promote the Structure. After step 430 of FIG. 5, the process passes to step 440. As reflected in the progression of step 430 to 440, any of a number of further steps may be taken to solicit investment. In step 440 of FIG. 5, the process returns to step 500 of FIG. 2.

Figure 6:
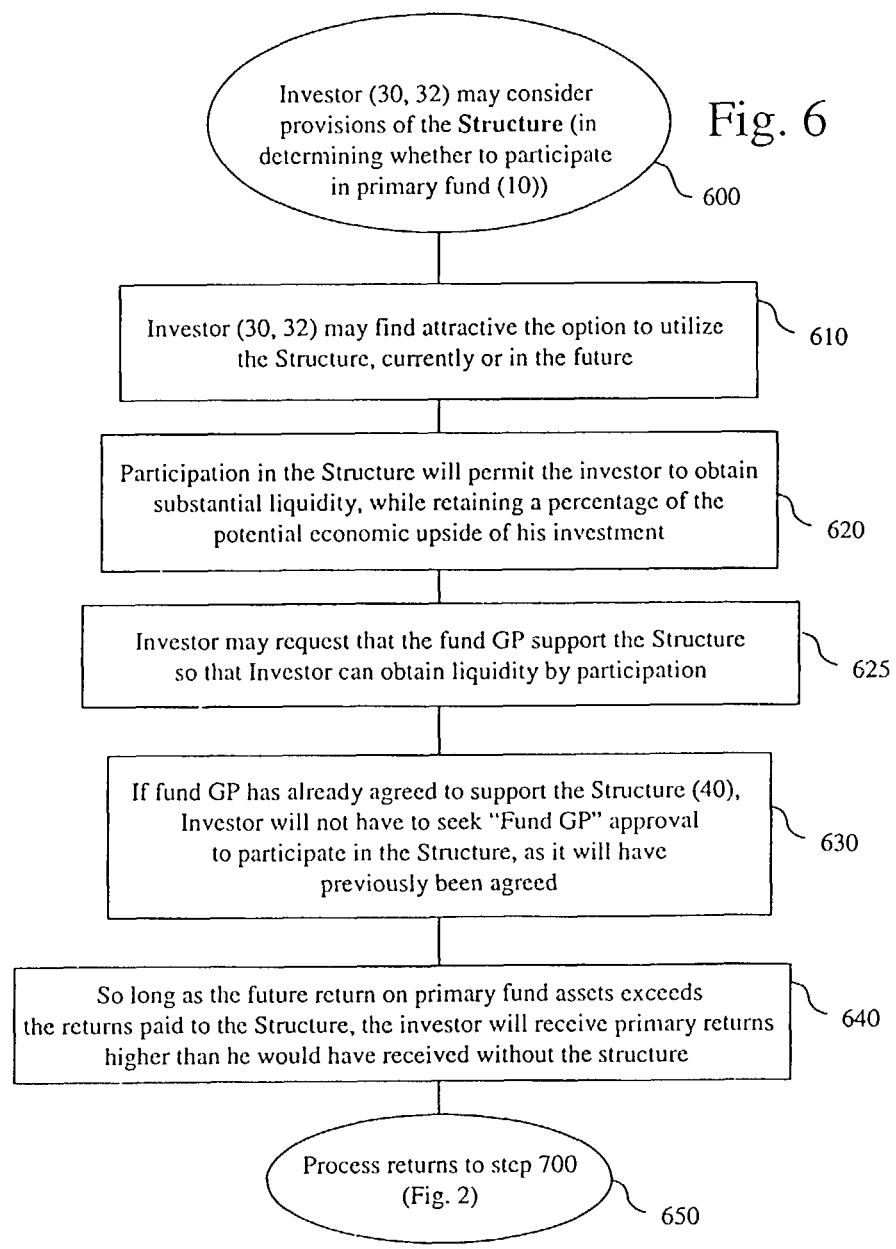
FIG. 6 is a flowchart showing further details of the "Investor may consider provisions of Structure, in determining whether to participate in primary fund, step of FIG. 2, in accordance with one embodiment of the invention.

FIG. 6 is a flowchart showing further details of the "Investor (30, 32) may consider provisions of the Structure, in determining whether to participate in the primary fund (10)," step 600 of FIG. 2, in accordance with one embodiment of the invention.

The process of FIG. 6 starts in step 600 and passes to step 610. In step 610, Investor (30, 32) may find attractive the option to utilize the Structure, currently or in the future. Then, in step 620, it is noted that participation in the Structure will permit the investor to obtain substantial liquidity, while retaining a percentage of the potential economic upside of his investment. Then in step 625, the investor may request that the fund GP support the Structure so that the Investor can obtain liquidity by participation.

Further, in step 630, if the fund GP (20) has already agreed to support the Structure 40, the investor 30 will not have to seek the approval of the Fund General Partner 20 to participate in the Structure, as it will have been previously agreed to. Then, in step 640, the investor considers that so long as the future return on primary fund assets exceeds the returns paid to the Structure, the investor will receive primary fund returns higher than he would have received without the Structure.

After step 640 of FIG. 6, the process passes to step 650. In step 650, the process returns to step 700 of FIG. 2.

Figure 7:
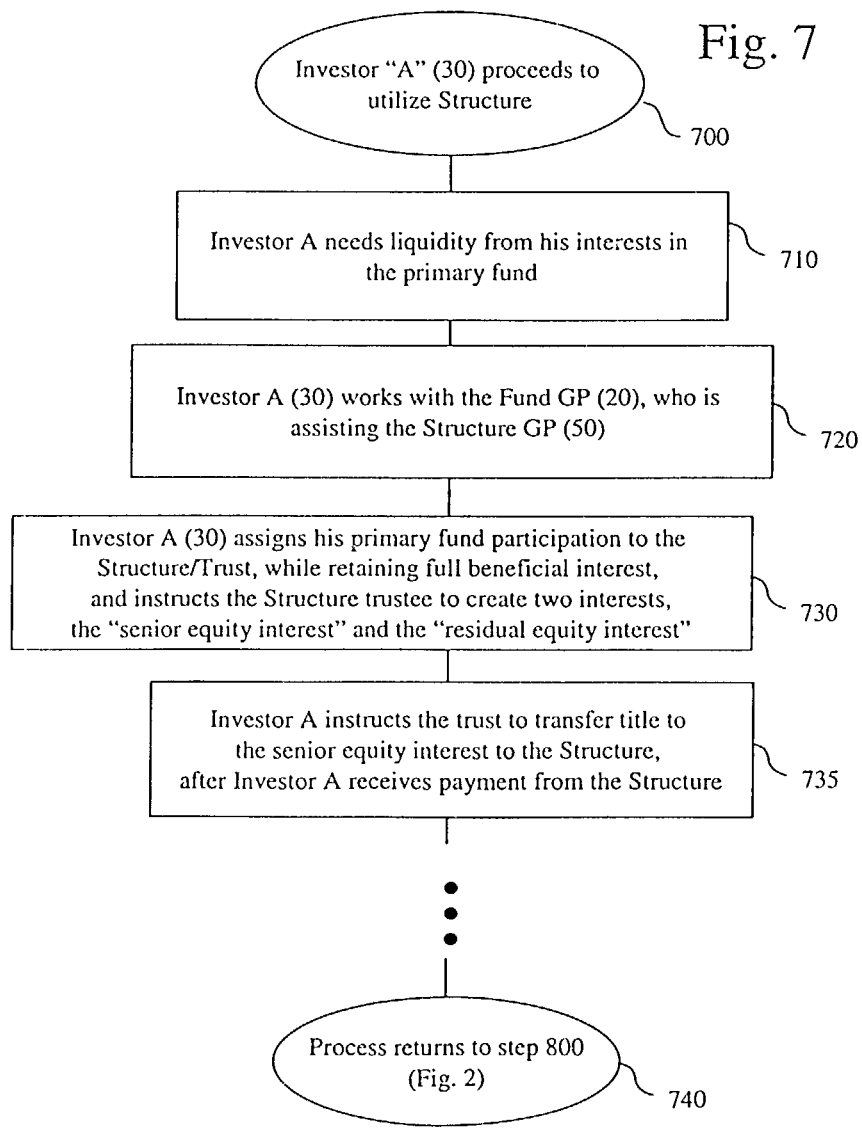
FIG. 7 is a flowchart showing further details of the "Investor A" proceeds to utilize Structure" step of FIG. 2, in accordance with one embodiment of the invention.

FIG. 7 is a flowchart showing further details of the "Investor A 30 proceeds to utilize Structure" step 700 of FIG. 2, in accordance with one embodiment of the invention. Note that FIG. 7 contrasts "Investor A" 30 of FIG. 1 (who illustratively uses the Structure as described herein) with "Investor B" 32, who does not use the Structure. It should further be noted that Investor B, and the interests of Investor B in the primary fund 10, are essentially unaffected by Investor A's use of the Structure.

As shown in FIG. 7, the process starts in step 700 and passes to step 710. In step 710, Investor A has determined that he needs to liquidate a portion of his interests in the primary fund. Then, in step 720, Investor A 30 works with the Fund GP 20, who is assisting the Structure GP 50. After step 720 of FIG. 7, the process passes to step 730.

In step 730, Investor A (30) assigns his primary fund participation to the Structure/Trust, while retaining full beneficial interest, and instructs the Structure trustee to create two interests, the "senior equity interest" and the "residual equity interest." That is, in this example, the tranche splitting mechanism 90, as described above, is the Structure trustee. Then, in step 735, the Investor A instructs the trust to transfer title to the senior equity interest to the Structure, after Investor A receives payment from the Structure.

After step 735 of FIG. 7, the process passes to step 740. As reflected in the progression of step 730 to 740, any number of further steps may be taken to effect Investor A's utilization of the Structure. In step 740, the process returns to step 800 of FIG. 2.

Figure 8:
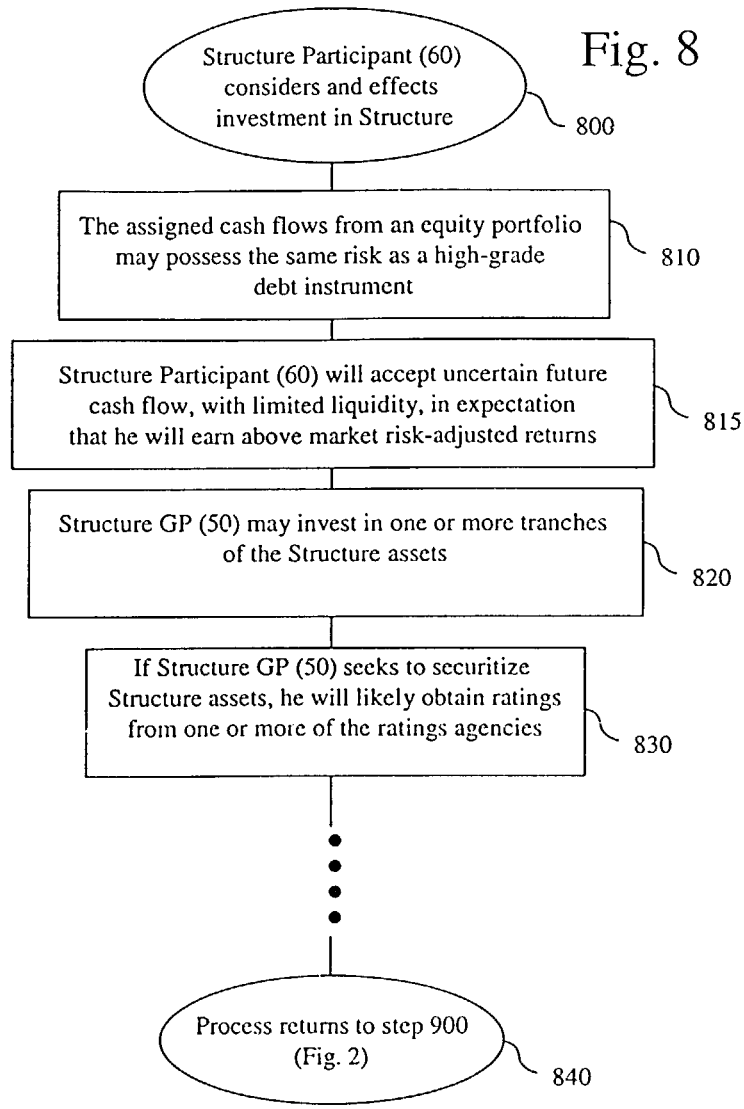
FIG. 8 is a flowchart showing further details of the "Structure Participant considers and effects investment in Structure" step of FIG. 2, in accordance with one embodiment of the invention.

FIG. 8 is a flowchart showing further details of the "Structure Participant (60) considers and effects investment in the Structure" step 800 of FIG. 2, in accordance with one embodiment of the invention.

As shown in FIG. 8, the sub-process starts in step 800 and passes to step 810. In step 810, the Structure participant 60 considers that assigned cash flow from an equity portfolio may possess the same risk as a high-grade debt instrument. Then, in step 815, Structure Participant (60) notes that he will accept uncertain future cash flow, with limited liquidity, in expectation that he will earn above market risk-adjusted returns. Further, in step 820, the Structure participant 60 (in this embodiment) considers that the Structure GP (50) may invest in one or more tranches of the Structure assets.

After step 820, the process passes to step 830. In step 830, the Structure participant 60 considers that if the Structure GP (50) seeks to securitize Structure assets, he will likely obtain ratings from one or more of the ratings agencies. This rating agency information may be used and considered by the Structure participant 60.

After step 830 of FIG. 8, the process passes to step 840. As reflected in the progression of step 830 to 840, any number of further steps may be taken in relation to the Structure participant's 60 investment in the Structure. In step 840 of FIG. 8, the process returns to step 900 of FIG. 2.

Figure 9:
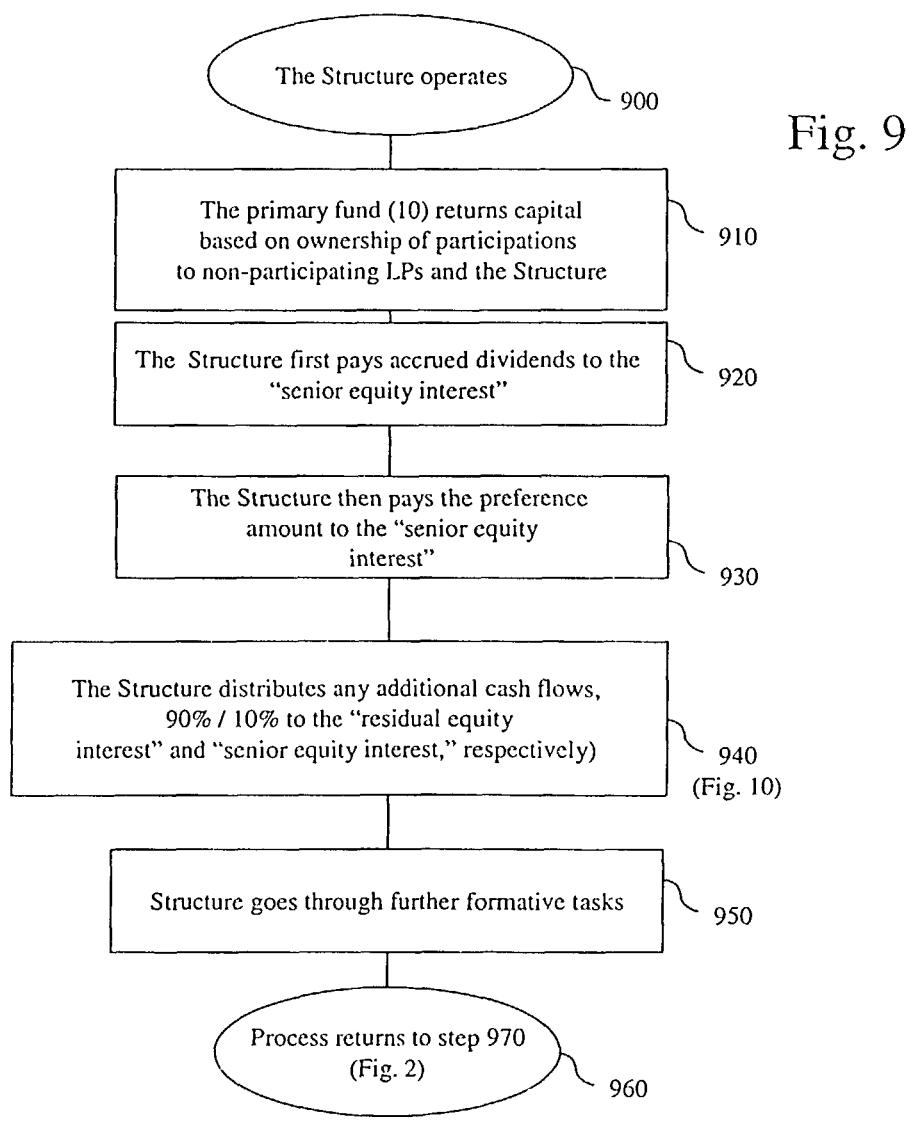
FIG. 9 is a flowchart showing further details of the "Structure operates" step of FIG. 2, in accordance with one embodiment of the invention.

FIG. 9 is a flowchart showing details of the "Structure operates" step 900 of FIG. 2, in accordance with one embodiment of the invention. As shown in FIG. 9, the process starts in step 900 and passes to step 910.

In step 910, the primary fund 10 returns capital based on ownership of participations, to non-participating LPs and the Structure. Then, the process passes to step 920. In step 920, the Structure first pays accrued dividends to the "senior equity interest". Then, in step 930, the Structure pays the preference amount to the "senior equity interest". Then, the process passes to step 940.

In step 940, the Structure distributes any additional cash flows, 90%/10% to the "residual equity interest" and "senior equity interest," respectively, for example. After step 940 of FIG. 9, the process passes to step 950. In step 950, the Structure goes through further formative tasks. Details of FIG. 9 are described below with reference to FIG. 10. After step 950, the process passes to step 960. In step 960, the process returns to step 970 of FIG. 2.

Figure 10:
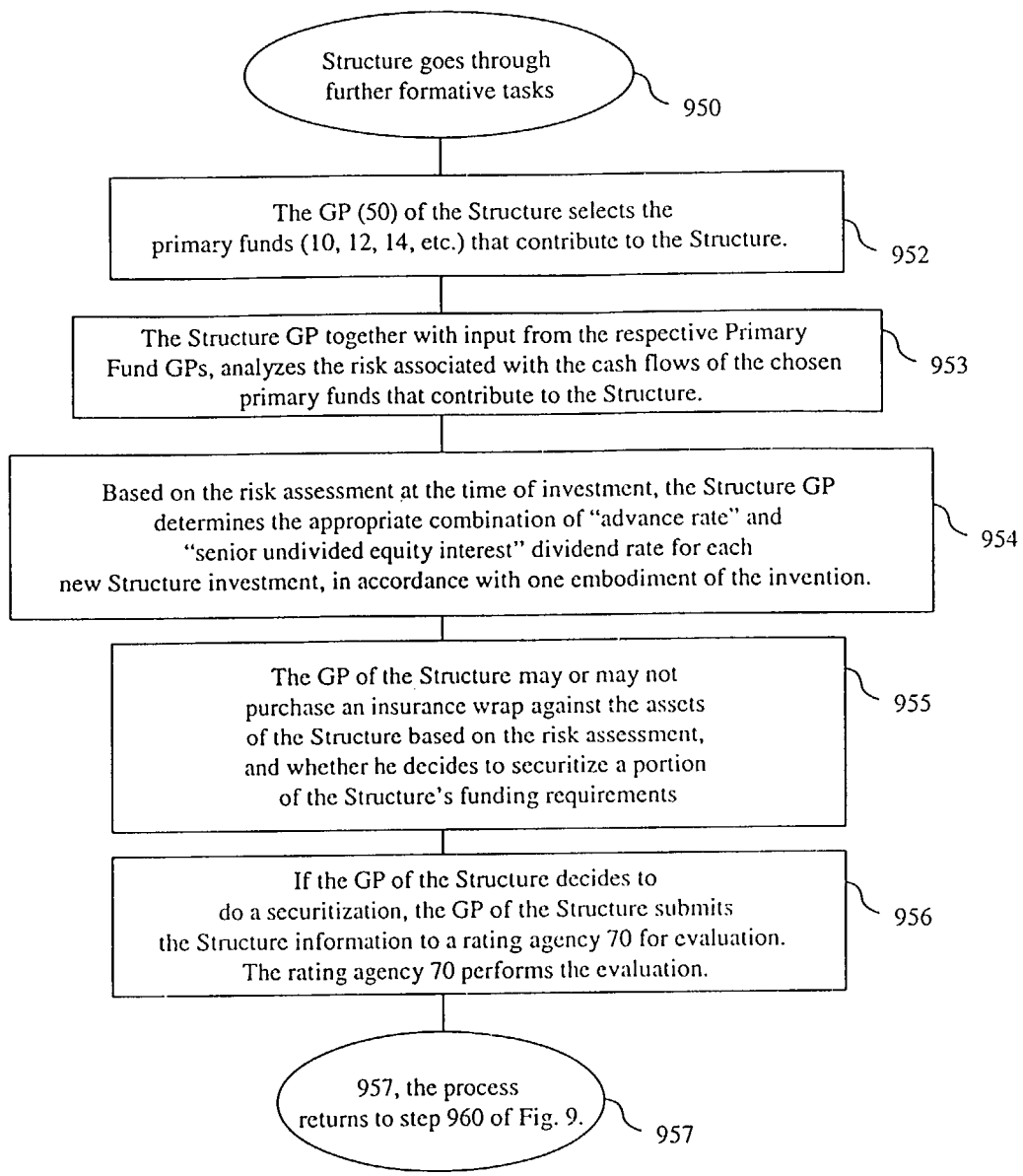
FIG. 10 is a flowchart showing further details of the "Structure goes through formative tasks" step of FIG. 9, in accordance with one embodiment of the invention.

FIG. 10 is a flowchart showing further details of the "Structure goes through further formative tasks" of FIG. 9. To explain, it is appreciated that the Structure may typically be in a formative state. That is, a Structure may routinely acquire further equity interests from Alternative Investment Funds and/or seek securitization, etc. for example. FIG. 10 is reflective of this realization.

Accordingly, the process of FIG. 10 starts in step 950 and passes to step 952. In step 952, the GP (50) of the Structure selects the primary funds (10, 12, 14, etc.) that contribute to the Structure. Then in step 953, the Structure GP together with input from the respective Primary Fund GPs, analyzes the risk associated with the cash flows of the chosen primary funds that contribute to the Structure. In step 954, based on the risk assessment at the time of investment, the Structure GP determines the appropriate combination of "advance rate" and "senior undivided equity interest" dividend rate for each new Structure investment, in accordance with one embodiment of the invention.

Then in step 955 the GP of the Structure may or may not purchase an insurance wrap against the assets of the Structure based on the risk assessment, and whether he decides to securitize a portion of the Structure's funding requirements. Then in step 956, if the GP of the Structure decides to do a securitization, the GP of the Structure submits the Structure information to a rating agency 70 for evaluation. The rating agency 70 performs the evaluation.

After step 956 of FIG. 10, the process passes to step 957. In step 957, the process returns to step 960 of FIG. 9.

As should be apparent, the steps of FIG. 10 may well correspond to the steps of FIG. 4 above, i.e., wherein the General Partner 50 of the Structure performs the formation tasks. Further, other ongoing formative type steps may be performed that are not identified in FIG. 10, as should be apparent to one of ordinary skill.

In accordance with further aspects of the invention, a large percentage of investors in AIFunds are tax-exempt entities, such as pension funds. Under US tax law, tax-exempt entities are not permitted to borrow against their investments, and debt is forbidden. However, tax-exempt entities can liquefy, or maximize the value of their AIFund investments using embodiments of the invention, because the transaction will not involve any debt. The tax-exempt investor will sell equity interests (cash flow tranches) to obtain all or part of the value of their original equity investment.

In accordance with one aspect of the invention, as described above, the primary fund participant 30 sells an interest to the General Partner 50 of the Structure, for example. However, in accordance with one embodiment of the invention, the Structure may be arranged so that, under certain circumstances at the option of the primary fund participant 30, this interest might be repurchased by the primary fund participant 30 at a previously agreed price. This might be the situation when the liquidity needs of the primary fund participant 30 change, i.e., such that the primary fund participant 30 does not need the liquidity.

Figure 11:
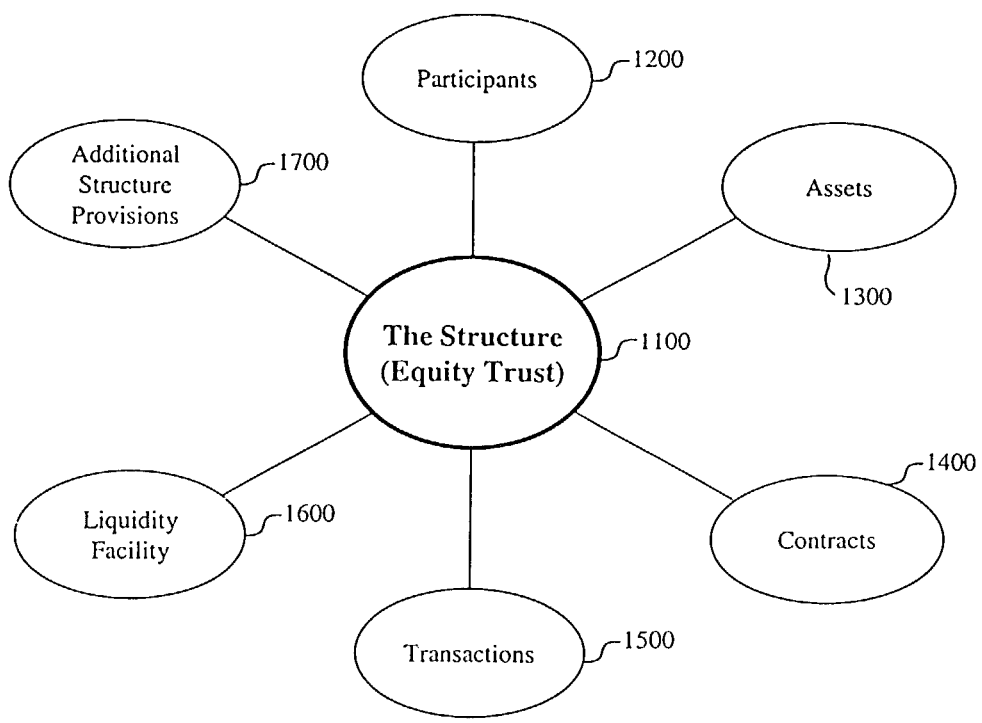
FIG. 11 is a diagram showing a Structure in accordance with a further embodiment of the invention.

FIG. 11 is a diagram showing such further aspects of the invention in accordance with one embodiment. In particular, FIG. 11-FIG. 17 show the terms of an illustrative term sheet in accordance with one embodiment of the invention. The various terms of the term sheet form what may be characterized as a Structure 1100. The Structure 1100 includes Participants 1200, Assets 1300, Contracts 1400, various Transactions 1500, a Liquid Facility 1600, as well as various additional Structure Provisions 1700.

In overview of the Structure 1100, in order to monetize a portion of an existing investment in a primary fund, an LP Investor contributes its limited partnership interest (an "LP Interest") to a special purpose trust created for that specific primary fund ("Fund XYZ LP Trust", or the "LP Trust"), for example. The LP Trust issues two types of trust certificates to the LP Investor: a Senior Undivided Equity Interest ("SUEI") and a Residual Undivided Equity Interest ("RUEI"). The LP Investor sells the SUEI to the SUEI Equity Trust, and retains the RUEI. Further, the SUEI Equity Trust raises money to purchase the SUEIs through the issuance of Trust Certificates and Senior Secured Notes.

In further explanation, the Participants 1200 of the Structure of FIG. 11 are described in further detail in FIG. 12. The Participants include an LP Investor who may be an eligible institutional and/or individual investors, approved by an Eligible Sponsor, for example. Further, the Eligible Sponsors may be specific top private equity fund sponsors, which are determined when developing a particular deal. Note that items in "{ }" in FIGS. 12-17 indicate items to be determined and/or items that would be negotiated in a particular deal.

As shown in FIG. 12, the Eligible Sponsor will be paid an annual fee of a particular percentage of the outstanding Senior Undivided Equity Interest (SUEI) balances, plus receive a percentage of the Residual Equity Distribution allocated to the SUEI, as compensation for marketing and providing other reporting services for the transaction. Such services might include, for example, LP Investor identification, valuation of LP Interests, permission for assignment of LP Interest to the LP Trust, and standard periodic reporting on market value and condition of the Private Equity Fund.

A further Participant as shown in FIG. 12 is the Trustee. The Trustee might be a suitable bank, for example. Another Participant is the Marketing and Servicing Agent. The Marketing and Servicing Agent role might be fulfilled by the Eligible Sponsors, for example. A further Participant is the Origination Agent. This role might be fulfilled by a specialty arm of a bank, for example.

A yet further Participant is an Investment Enhancer. The Investment Enhancer might be an insurance company or financial services company acceptable to the Credit Enhancer and the Rating Agencies. Further, the Credit Enhancer may be a monoline insurance company rated Alternative Investment Fund, for example. A further Participant may be a Structuring and
Placement Agent, which might also be an entity that is part of or associated with a bank, for example.

Various assets are associated with the Structure. The Assets 1300 are described in further detail in FIG. 13. One Asset of the Structure is the Senior Undivided Equity Interest ("SUEI"). Each SUEI represents a senior ownership interest in the assets of the LP Trust. That is, the SUEI represents an ownership interest in the first cash distributions available to the LP Trust, as holders of the related LP Interests, up to the SUEI Preferred Capital Amount. In addition, the SUEI receives a Cumulative Preferred Distribution amount, plus 10%, for example, of the Residual Equity Distributions, in accordance with one embodiment of the invention.

As noted in FIG. 13, taxes and voting rights may be allocated on a pro rata basis, between the SUEI and the Residual Undivided Equity Interest ("RUEI"), described below, based on the initial SUEI Preferred Capital Amount and the Market Value of the LP Interest.

It should further be noted that the workings of the Structure depend on the SUIE being considered equity. Accordingly, it is appreciated that the terms of the particular deal, i.e., the terms of the Structure, may need to be amended to be sure the SUEI is indeed considered Equity.

A further asset of the Structure is the Residual Undivided Equity Interest ("RUEI"), in accordance with this embodiment of the invention. Each RUEI represents a subordinated ownership interest in the assets of the LP Trust. That is, the RUEI represents an ownership interest in 90%, for example, of the Residual Equity Distributions available to the LP Trust.

Hereinafter, further assets associated with the SUEI and the RUEI will be described. A particular piece of the SUEI is the SUEI Preferred Capital Amount. This is the face amount of the SUEI as determined on an individual private equity fund basis. A further piece of the SUEI is the Preferred Cumulative Distribution. The value of the Preferred Cumulative Distribution might be 15% as a percentage of the current outstanding capital of the SUEI (Preferred Capital Amount, plus Preferred Cumulative Distribution amounts not yet received, compounded semi-annually), for example. Accordingly, the Total Preferred SUEI Distribution is the SUEI Preferred Capital Amount, plus the Preferred Cumulative Distribution.

The Residual Equity Distributions make up the RUEI. The Residual Equity Distributions equal all amounts distributed by LP Trust after the Total Preferred SUEI Distributions are made, in accordance with this example of the invention.

Further assets associated with the Structure are the Limited Partner (LP) Trust Assets. These assets include LP Interests contributed by the LP Investor and approved by the Eligible Sponsor. It is further noted that, in accordance with one embodiment of the invention, a separate LP Trust is created for each private equity fund.

Yet further assets associated with the Structure are the SUEI Trust Assets. The SUEI Trust Assets are the Senior Undivided Equity Interests ("SUEIs") in the LP Trusts, all dividends and payments of capital on the SUEI, the Support Contracts, and all payments received on the Support Contracts, for example.

In accordance with one embodiment of the invention, the Contracts 1400 associated with the Structure are described in FIG. 14, and may be characterized as Support Contracts. A Support Contract is a contract between an Investment Enhancer and the SUEI Equity Trust. The contract obligates the Investment Enhancer to fund an amount on the Final Payment Date sufficient to retire all outstanding Senior Secured Notes. If the Investment Enhancer makes a payment on the Final Payment Date, the Investment Enhancer will take title to all SUEI Equity Trust Assets. The Investment Enhancer will be paid a per annum fee, for providing such support.

The face amount of the Support Contract may be determined based on the expected initial Senior Secured Notes that will be financed. It is anticipated that the face amount of the Support Contract might be equal to 30-40% of the current valuation of the limited partnership investment, depending on the Eligible Fund. Further, it is noted that the legal form of the Support Contract should be acceptable to the Credit Enhancer and the rating agencies, and is anticipated to be in the form of a "Put" or "floor" equity derivative, for example.

One aspect of the Support Contracts is the Support Contract Exercise Rights. The Support Contract Exercise Rights provide that if all of the Senior Secured Notes have not been paid on the Final Payment Date, the Trust Certificate Holders will have the option (i) to allow the Support Contract to lapse, and retain the assets in the SUEI Equity Trust, or (ii) put the SUEI Equity Trust assets to the Credit Enhancer, in accordance with one embodiment of the invention. Further, if the Trust Certificate holders put the SUEI Equity Trust Assets to the Credit Enhancer, the Credit Enhancer will have the option: (i) to allow the Support Contract to lapse, and retain the assets in the SUEI Equity Trust, or (ii) to exercise the Support Contract, receive payment, and put the assets in the SUEI Equity Trust to the Investment Enhancer, in accordance with one embodiment of the invention.

Further, various Transactions 1500 associated with the Structure are described in further detail in FIG. 15. One transaction is the sale of SUEI. In the sale SUEI, the LP Investors offer to sell, and the SUEI Trust agrees to purchase, for a price equal to the SUEI Preferred Capital Amount. To pay for the SUEIs, the SUEI Trust issues Senior Secured Notes and Trust Certificates. Accordingly, for example, the securities offered might be Senior Secured Notes in the value of $1 billion, for example, and Trust Certificates in the amount of $100 million, for example. Senior Secured Notes represent a right to receive payments of interest at the applicable yield on the Senior Secured Notes and principal on or before the Final Payment Date. The Senior Secured Notes are insured by the Credit Enhancer, in accordance with this embodiment of the invention. Further, the Yield on the Senior Secured Notes might be a Floating rate Libor, plus a particular percentage with a cap, as desired.

Trust Certificates represent a fractional undivided beneficial interest in the SUEI Trust Assets and represent the right to receive all payments made to the SUEI Trust, after retirement of all Senior Secured Notes. It is further noted, with reference to Principle Payments of Senior Secured Notes, that Senior Secured Notes will amortize immediately based on cash distributions available to the LP Trust, after payment of certain fees, interest on the Senior Secured Notes, and reimbursement of the cash collateral account or Liquidity Facility, if required, in accordance with one embodiment of the invention.

Further, the Final Payment Date might be 5 years from closing date, for example.

With regard to the Allocations of Distributions, Distributions received on the SUEI, payments received on any Support Contracts and investment earnings will be distributed in a particular priority. For example, the order of priority might be as follows:

1. Trustee Fees;
2. Servicing Fees;
3. Support Contract Fees;
4. Interest due on Senior Secured Notes;
5. Origination and Marketing Fees;
6. Reimbursement of the Cash Collateral Account or Liquidity Facility;
7. Principal on Senior Secured Notes;
8. To the Trust Certificates (after the Senior Secured Notes have been paid in full).

If distributions received in the current period are insufficient to cover 1-5 above, amounts as
necessary may be taken out of a Liquidity Facility, as described below. If funds are insufficient, or the principal amount of the Senior Notes are not paid in full by the Final Payment Date, the Credit Enhancer will make any payments necessary, after all amounts on deposit in the trust have been used, in accordance with one embodiment of the invention.

In accordance with this embodiment of the invention, the Structure may include a Liquidity Facility 1600 as shown in FIG. 16. That is, in accordance with one embodiment of the invention, a Liquidity Facility will be established at Closing by the Trust Certificate holders equal to 25% of the amount of the Support Contract, for example, to cover temporary shortfalls in interest on the Senior Trust Notes, and other expenses. The balance available from the Liquidity Facility may be maintained such that the Support Contract plus the Liquidity Facility always exceeds 112%, for example, of the outstanding Senior Secured Notes. Further, the Form and provider of the Liquidity Facility will be acceptable to the Credit Enhancer and the rating Agencies.

As shown in FIG. 17, various additional Structure Provisions 1700 may be utilized. In particular, Representation and Warranties, Indemnification and Events of Default provisions may be provided. That is, Senior Secured Note holders, Trust Certificate holders, Servicer, and each Sponsor will make customary representations, warranties and indemnifications.

Further, various Legal Opinions may be involved in the Structure. For example, a tax opinion will be received approving: (i) equity treatment of the SUEI; and (ii) the 'true sale' treatment of the transaction between the LP Investor and the SUEI Equity Trust.

Other standard opinions as necessary will also be provided. For example, a GAAP Accounting Treatment opinion may be obtained. It is anticipated that for GAAP accounting purposes the LP Trust will be considered a QSPE, and the sale of the SUEI will be considered a sale under FAS140.

Further, a Tax Status opinion may be obtained. With respect to the tax treatment, it is anticipated that for Federal Tax Purposes the SUEI will be considered equity; the sale of the SUEI will not be considered a financing; the Senior Secured Notes will be treated a debt of the SUEI Equity Trust; and the Trust Certificates will be treated as equity of the SUEI Equity Trust.

Further, a rating opinion may be obtained. It is expected that the Senior Secured Notes will be rated A1-P1 or its equivalent, by at least two of the nationally recognized rating agencies.

Further, suitable provisions in the Structure may address Fees and Expenses. In accordance with one embodiment of the invention, all Upfront Legal, Accounting, Structuring Agent, Placement Agent, and other Issuance Fees and Expenses will be paid by the LP Investors, Certificate Holders and the Sponsors, as agreed to upfront. Further, all Trustee Fees, Origination Fees, Marketing Fees, Servicing Fees, Support Contract Fees, Credit Enhancement Fees, and any other miscellaneous fees and expenses will be paid out of the SUEI Trust Assets.

Accordingly, a wide variety of provisions are described above in accordance with one embodiment of the Structure of the invention. It is appreciated that such provisions may be varied as desired. Further, additional provisions may well be added depending on the particulars of a specific deal.

Hereinafter, further aspects of the invention will be disclosed. As described in the "Background of the Invention," it is appreciated that corporations typically have a corporate capital structure that permits different types of loans, such as loans secured with assets, unsecured loans, subordinated loans, etc., for example. From an equity perspective, there can be common and preferred stocks. The rights and entitlements of each class of equity can be quite variable regarding such issues as voting, conversion, control and preference. Creation of new preferred stock requires issuer participation, and is complicated because the approval of all securities subordinated by the new issue must usually be sought.

As is also described above, the underlying asset for CDOs, CLOs and CMOs (collatorized debt obligations, collatorized loan obligations and collatorized mortgage obligations), for example, may typically be a portfolio of various debt instruments. The priority/tranche technology was developed to finance these portfolios more efficiently, i.e., wherein the underlying assets are debt. Instead of selling the generic, bundled exposure of the debt portfolio, different classes of investors, each with different risk reward and/or investment outlooks are offered interests tailored to their particular preferences. The aggregate cash flow arising from the portfolio of debt in the securitized issue is distributed based on a "waterfall" of priorities. Each separate cash flow "tranche" has a given priority of claims regarding repayment, e.g. the senior most tranche might have a rating of AAA, while the junior most might have the risk characteristics of junk bonds or equity. However, various shortcomings exist with known techniques in the situation when a general partner of an Alternative Investment Fund desires liquidity, but cannot borrow against stock pursuant to Alternative Investment Fund powers.

In accordance with a further embodiment of the invention, what may be characterized as Synthetic Preferred Stock ("SPS") applies the priority/tranche concepts of the invention to individual companies. The value of the SPS invention is that the efficiencies of priority/tranche technology can be applied to portfolios of existing equity positions (in a single company, or multiple companies), whether held, directly or indirectly, by one owner or many. The proposed cash flow prioritization for a portfolio of stock requires only the approval of those who control the equity interest in one or more individual companies. It does not require any action by, or approval of, the issuer or any of its investors. The value of this new approach, in accordance with one embodiment of the invention, chiefly relates to negotiated transactions between the current holder of equity securities, and investors interested in taking either a senior or junior position with regard to the stock. It is proposed that the Synthetic Preferred Stock would not require the filing of a prospectus (unless securities are expected to be redistributed), or any other involvement with the SEC.

It is appreciated that investors come in all shapes and sizes. There are numerous circumstances where SPS might improve economic efficiency. So long as investors have different strategies or perceptions of risk, optimizing the distribution of risks and benefits into the hands of those who most value the individual attributes will improve capital market efficiency.

Hereinafter, the general application of SPS will be described. As an example, SPS may provide incremental efficiency for the Private Equity/Venture Capital Funds ("PE/VC") market, for example. General Partners ("GPs") for PE/VC funds are good at picking companies that have potential to rapidly grow in value, and then helping the companies to realize that potential. Expected PE/VC returns require fund investments to rise very quickly in value, and for GPs to exit as soon as the rapid rise in value begins to decline. PE/VC GPs are less interested and less capable of managing more stable companies that have reached their potential. However, sometimes liquidation of a successful PE/VC investment must be delayed because of market conditions. Such companies may cease to provide the expected PE/VC returns. Retention of such investments within PE/VC funds disadvantages both Limited Partners ("LPs") and GPs. LPs would prefer to redeploy their assets in investments expected to grow at high rates. GP performance economics are reduced by retention of such lower return investments.

The invention proposes that there may be value in establishing a new level of investment management intermediary. PE/VC GPs cease to add value when an investment begins to provide stable returns. At that stage, it may make sense to place such investments in the hands of investors that can provide less costly financing and who are more adept at realizing value in later stage, more stable companies. Synthetic Preferred Stock, in accordance with one embodiment of the invention, might permit investors with a lower risk appetite than PE/VC investors to offer LPs some immediate liquidity, while also assuring that ultimate liquidation of the investment is managed in the best manner possible.

In the simplest example of Synthetic Preferred Stock, in accordance with one embodiment of the invention, imagine the owner of common equity in a private company seeks liquidity, but cannot borrow against the stock. The owner could contribute the stock to a trust. The trust could establish two classes of equity: one class of SPS, with a preference, a cumulative preferred dividend and perhaps some upside participation; and the residual to the junior class. The liquidity provider could then buy the synthetic preferred stock from the owner.

The Synthetic Preferred Stock may initially appear economically the same as such things as swaps or options on the equity. However, Synthetic Preferred Stock can be much richer and provide a great deal more flexibility than even complex options. Though there can be many complexities connected with options/swaps on stocks, ultimately there is a crisp realization An example is perhaps the best means to illustrate this difference.

In accordance with one embodiment of the invention, the Synthetic Preferred Stock may be used to liquefy an equity position held by a Private Equity Fund. Suppose the dominant position remaining in a Private Equity Fund ("PEF") is majority ownership of the common stock of a private company ("ABC"). The PEF GP would like to provide liquidity to its investors and distribute the interests in order to terminate the fund. However, market conditions prevent the GP from achieving a satisfactory price for ABC, and the LPs do not want the GP to distribute illiquid shares in a private company. By use of Synthetic Preferred Stock, the GP can distribute a large portion of the value of the ABC holding currently in cash, while retaining control/management of the liquidation of the residual interest.

The use of SPS permits a very flexible arrangement capable of serving the interests of all parties. The GP would like to exit ABC as soon as possible. ABC's value will grow in a normal, steady manner, but at returns far below expected returns for LBO funds. The GP's value-added has run its course, and their ongoing involvement will produce little incremental benefit. The GP would like to distribute all the remaining assets of PEF and close the fund because retention of ABC will continue to bring down PEF returns.

Further, LPs in the PEF would like their investment to be returned. The remaining assets in the PEF no longer produce LBO returns and the LPs would like to redeploy their alternative investment assets into higher yielding investments. The SPS can permit the GP to distribute a substantial immediate cash payment to LPs. The GP can then retain the residual interest, or subject to certain conditions, dividend out the residual interest to the LPs.

Further, the buyer of the SPS can be more patient than the PEF, because their expected returns are lower, but the holders of the SPS are not necessarily long-term equity investors. Further, the holders of the SPS need to establish protections to permit them to take action if the value of ABC's common equity declines, or the trust is not be liquidated within some reasonable time period.

Figure 18:
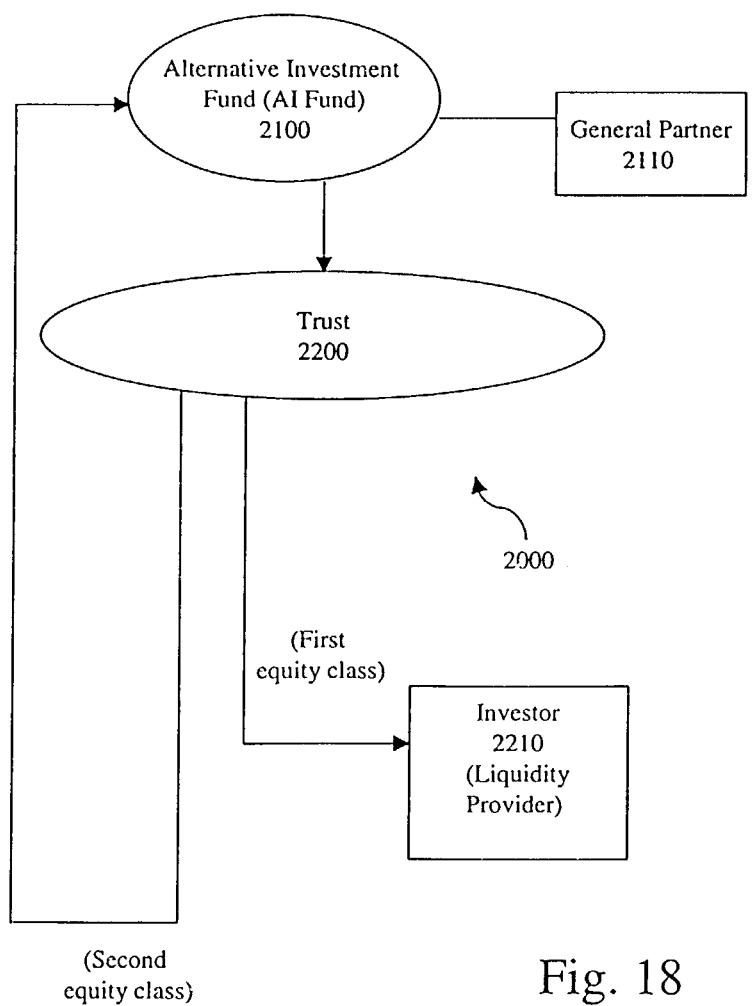
FIG. 18 is a block diagram showing aspects of "synthetic preferred stock" in accordance with one embodiment of the invention.

In accordance with one embodiment of the invention, most GPs of AIFunds are prohibited from incurring debt within their respective funds. For example, such GPs could not borrow against an equity holding in a private company. However, AIFund GPs can liquefy some investments using the systems and methods of the invention, by selling equity interests. To explain, FIG. 18 is a block diagram showing further aspects of the SPS with reference to a transaction system 2000. FIG. 18 is described below with reference to the flowcharts of FIGS. 19 and 20. The transaction system 2000 includes an Alternative Investment Fund (AI Fund) 2100, which is managed by a General Partner 2110. The General partner, either alone or working with a liquidity provider, effects the creation of a Trust 2200. As described below, the General Partner transfers title to the stock (2100) from the AI Fund to the Trust. The Trust then sets up two different classes of equity, as described below.

Figure 19:
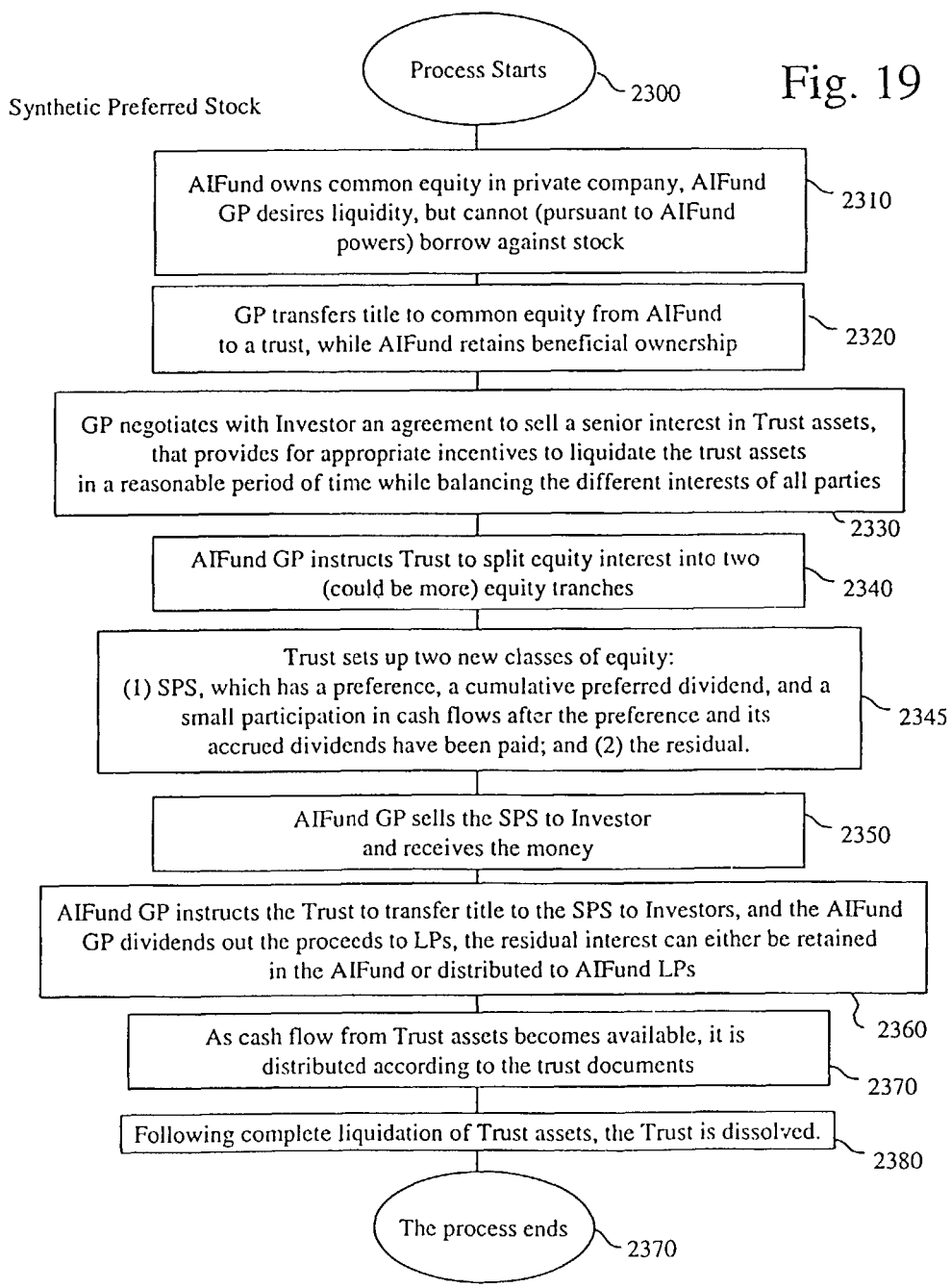
FIG. 19 is a flowchart showing a process of using "synthetic preferred stock" in accordance with one embodiment of the invention.

FIG. 19 is a flowchart showing a process in accordance with one embodiment of the invention relating to the SPS. As shown in FIG. 19, the process starts in step 2300 and passes to step 2310. In step 2310, the AIFund owns common equity in a private company. Further, the AIFund GP desires liquidity, but cannot, pursuant to AIFund powers, borrow against stock.

As a result, in accordance with one embodiment of the invention, in step 2320, the Fund GP transfers title to common equity from the AIFund to a trust. However, the AIFund retains beneficial ownership. Then, in step 2330, the GP negotiates an agreement with an Investor to sell a senior interest in trust assets, that provides for appropriate incentives to liquidate the trust assets in a reasonable period of time while balancing the different interests of all parties. Then, in step 2340, the AIFund GP instructs the Trust to split equity interest into two, or more, equity tranches.

The process then passes to step 2345. In step 2345, the trust sets up two new classes of equity. A first class is the SPS, which has a preference, a cumulative preferred dividend, and a small participation in cash flows after the preference and its accrued dividends have been paid; and a second class, the residual. Then the process passes to step 2350.

In step 2350, the AIFund GP sells the SPS to an Investor 2210 and receives the money. Then, in step 2360, the AIFund GP instructs the Trust to transfer title to the SPS to Investors, and the AIFund GP dividends out the proceeds to LPs. Further, the residual interest can either be retained in the AIFund or distributed to AIFund LPs. Then, in step 2370, as cash flow from Trust assets becomes available, it is distributed according to the trust documents After step 2370, in step 2380, following complete liquidation of Trust assets, the Trust is dissolved. The process then passes to step 2370, and the process is terminated.

Figure 20:
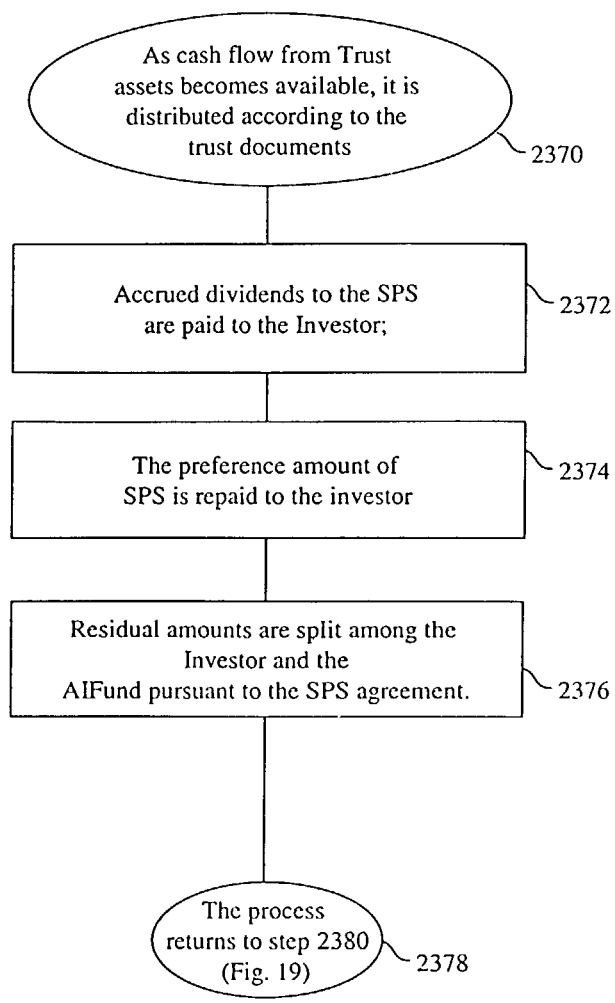
FIG. 20 is a flowchart showing further details of the process of FIG. 19 in accordance with one embodiment of the invention.

FIG. 20 is a flowchart showing in further detail the "as cash flow from Trust assets becomes available, it is distributed according to the trust documents" step 2370 of FIG. 19. The process of FIG. 20 starts in step 2370 and passes to step 2372. In step 2372, accrued dividends to the SPS are paid to the Investor 2210.

Then, in step 2374, the preference amount of the SPS is repaid to the Investor. Then in step 2376, residual amounts are split among the Investor and the AIFund pursuant to the SPS agreement.

After step 2376, the process passes to step 2378. In step 2378, the process returns to step 2380 of FIG. 19, and proceeds as described above.

The systems and methods of the invention have been described above in accordance with various embodiments. Illustratively, the systems and methods of the invention have been described in the context of an ordinary limited partnership structure, with general partners, limited partners and participations. However, it is appreciated that there may well be other legal structures, other than limited partnerships, for which the systems and methods of the invention may be applied.

Further, it is appreciated that in the various embodiments described above, the invention is discussed in terms of the role that various persons or entities play. That is, with respect to FIG. 1, the General Partner 20 of the private equity fund plays a role, the General Partner 50 of the Structure plays a role, and the primary fund participant 30 plays a role. However, the respective roles played by two or more persons or entities as described above may in further embodiments be played by one person or entity. Alternatively, the particular role played by one person or entity as described above may in further embodiments be played by two or more persons or entities. Further, it is appreciated that a particular role played by one person or entity, as described above, may in other embodiments be played fully by a different person or entity. Accordingly, within the bounds of the invention, there are a wide variety of actions that a particular person or entity may take in effecting the transaction. For example, a primary fund participant 30, such as a strong hands primary fund participant 30, might also act in the role of a Structure participant 60.

In addition, it is appreciated that the risks among different AIFunds may be diversified, as desired. That is, a Structure participant 60 may choose participations, in the Structure 40, having varying risks. This may be important to obtaining the cheapest "wrap" and/or highest rating service shadow rating. It should further be noted that both the AI Fund and the Structure as described herein deal with equity interests. However, it should be appreciated that an investor may well fund that equity interest with debt.

In summary, the invention includes a system and method for efficiently providing liquidity to LP investors in AIFunds. The proposed transaction (the "Structure"), in accordance with one embodiment of the invention, fundamentally alters the characteristics of AIFund participations to attract new and more efficient investors to the market. Taking elements of the now unsaleable leveraged deals, the Structure also accesses debt markets, using insurance wraps for example, to fund purchase of AIFund cash flows.

As described above, FIG. 1 is a block diagram illustrating one implementation of a liquidity Structure in connection with a primary fund. The various participants such as limited partners (30,32) and general partner 20 of the Alternative Investment Fund 10 may communicate over any suitable network 4, as shown in FIG. 1. The participants may communicate using computers comprising any known type of computer and may operate using any one of a variety of operating programs such as the Microsoft Windows™ 98 programs. For example, the participant computers preferably include a controller, a user interface, a network interface, and a memory. The controller may be connected to the memory via a bus. The memory may comprise a RAM, a ROM, and other types of storage devices such as a CDROM or other optical storage.

The network 4, as shown in FIG. 1, can be formed as an intranet, a PAN (Personal Area Network), a LAN (Local Area Network), a WAN (Wide Area Network), a MAN (Metropolitan Area Network) or other type of network. The network 4 may alternatively use wireless technology to connect computers together. The user devices operated by the limited partners 30, the general partners 20 and the liquidity Structure 40 may also communicate with the Internet via an Internet service provider. The network 4 may operate using any network-enabled code, such as Hyper Text Markup Language (HTML), Dynamic HTML, Extensible Markup Language (XML), Extensible style sheet and Specification Language (DSSSL), Java™, etc.

Information pertaining to the primary fund 10, for example, may be stored in a database, which may, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

In further general explanation of the technology that may be used to implement the method and system of the invention, as described above, FIGS. 1, 11 and 18 show embodiments of the system of the invention. Further, FIGS. 2-9, 19 and 20 illustratively show various steps of one embodiment of the method of the invention.

The systems that are used by the various entities of the invention, or portions of such systems, may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, minicomputer or mainframe for example, a programmed microprocessor, a microcontroller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented system for providing liquidity to an AI fund through the use of a liquidation trust, the liquidation trust managed by a structure general partner and in communication with a transaction structure via a network, the transaction structure operable to monitor value arising from the AI fund, wherein the AI fund is managed by a fund general partner and a plurality of AI fund investors commit to investment in the AI fund, wherein the AI fund investors are able to utilize the transaction structure to obtain liquidity, the computer implemented system comprising:

a memory storing information and at least one set of instructions, the information pertaining to the liquidation trust component of the transaction structure, the liquidation trust providing liquidity to the AI fund, wherein the AI fund comprises equity interest in investments selected from a group consisting of private equity funds, hedge funds, leveraged buyout funds, venture capital funds, partnerships, real estate investment trusts, real estate properties, and private company stocks;

at least one computer processor accessing the information stored in memory and the at least one set of instructions to perform steps including:

receiving an assignment from a designated AI fund investor of a portion of a designated AI fund investment to the liquidation trust, and conveying the assignment from the fund general partner to the structure general partner, wherein the fund general partner and the structure general partner are distinct;

determining funds for receipt by the designated AI fund investor in return for the assignment;

establishing at least two classes of trust equity interests based on the assignment, the two classes of trust equity interests providing distributions based on returns on the assigned portion and including a senior equity interest and a junior equity interest;

determining the senior equity interest by calculating (1) a preferred amount equity component to be paid in priority to the junior equity interest and (2) a first portion of a non-preferred equity component that is paid after satisfaction of the preferred amount;

calculating the junior equity interest comprising a second portion of the non-preferred equity component that is paid after satisfaction of the preferred amount, wherein the senior equity interest and junior interest thereby share in the non-preferred equity component return;

transferring title of the senior equity interest from the designated AI fund investor to the liquidation trust;

assigning the junior equity interest from the liquidation trust to the designated AI fund investor;

assigning the senior equity interest from the liquidation trust to a trust participant other than the designated AI fund investor, thereby providing for at least the one designated AI fund investor to obtain a liquidation of AI funds while continuing to share in a potential upside return based on the junior equity interest; and receiving capital at the liquidation trust from the AI fund based on the assignment from the designated AI fund investor and calculating payment to the trust participant and the AI fund investor.

2. The system of claim 1, wherein the senior equity interest includes the preferred amount and a portion of a residual component of capital return following satisfaction of the preference amount.

3. The computer-implemented system of claim 1, wherein the preferred amount corresponds to no greater than 30% of the fair market value of the designated portion of the interest, thereby providing for the senior equity interest holder to receive returns from the designated portion of the interest in the AI fund up to that preferred amount before returns are paid to the junior equity interest holder.

4. The computer-implemented system of claim 1, wherein, wherein the preferred amount is 30% or less of the fair-market value of the designated portion of the interest, thereby providing a senior equity interest that has the characteristics of investment grade debt.

5. The computer-implemented system of claim 1, wherein the designating AI fund investor receives funds corresponding to no greater than 30% of the fair-market value of the designated portion of the interest in the AI fund, thereby providing the designating AI fund investor no greater than 30% liquidity while maintaining a longer-term upside interest in the performance of the AI fund through the junior equity interest held by the designating AI fund investor.

6. The computer-implemented system of claim 1, wherein the non-preferred equity component is paid out to the trust equity interests in subordinate priority to the preferred advance rate amount, the senior equity interest receiving a first portion comprising 10% of the non-preferred equity component and the junior interest receiving a second portion comprising 90% of the non-preferred equity component, thereby providing for the designating AI fund investor holder of the junior equity interest and the holder of the senior equity interest to share in the long-term upside of the designated AI fund interest.

7. The computer-implemented system of claim 1, wherein the liquidation trust establishes a plurality of equity trust interests comprising a senior interest and a plurality of junior interests, the junior interests being subordinate in priority to the senior interest, each of the junior interests having established return components that define the priorities as between said junior interests.

8. The computer-implemented system of claim 1, wherein the liquidation trust establishes a plurality of equity tranches corresponding to the senior equity interest and a plurality of junior equity interests.

9. The computer-implemented system of claim 8, wherein the non-preferred equity component is shared among the senior equity interest and multiple junior equity interests.

10. The computer-implemented system of claim 1, wherein the entity that receives the senior equity interest is a individual buyer.

11. The computer-implemented system of claim 1, wherein the entity that receives the senior equity interest is a second fund.

12. The system of claim 11, wherein the second fund pools the senior equity interest with senior equity interests from other alternative investment funds or from other AI fund investors.

13. The computer-implemented system of claim 1, wherein the entity that receives the senior equity interest is a second trust.

14. The computer-implemented system of claim 1, wherein the designated investor's interest is an ownership interest in the AI fund.

15. The computer-implemented system of claim 1, wherein the designated investor's interest is a right to distributions from the investor's ownership interest in the AI fund.

16. The computer-implemented system of claim 1, wherein the compositions and respective priorities of the senior equity interest and the junior equity interest are negotiated between the designating AI fund investor and a buyer receiving the senior equity interest.

17. The computer-implemented system of claim 1, wherein a plurality of AI fund investors designate portions of their respective interests in the AI fund for liquidation, the designations resulting in issued classes of trust equity interests that differ between at least some designating AI fund investors.

18. The computer-implemented system of claim 17 wherein the AI fund investors can select the portion of their respective interests to be liquidated, such that some investors liquidate different-sized interests than others.

19. The computer-implemented system of claim 1, wherein the senior equity interest has priority with regard to the junior equity interest, but is subordinate in priority to another senior equity interest.

20. The computer-implemented system of claim 1, wherein the senior equity interest has a first portion of a non-preferred equity component, the junior interest has a second portion of the non-preferred equity component, and there is at least one additional trust equity interest subordinate to the senior equity interest that receives a third portion of the non-preferred equity component.

21. The computer-implemented system of claim 1, wherein the AI fund investor repurchases or buys back all or a portion of the senior equity interest.

22. The computer-implemented system of claim 1, wherein the AI fund investor sells all or a portion of the junior equity interest to a third party.

* * * * *